United States Patent
Zhou

(10) Patent No.: US 11,331,572 B2
(45) Date of Patent: May 17, 2022

(54) DEVICES, METHODS, AND GRAPHICAL USER INTERFACES FOR PROVIDING GAME CONTROLS

(71) Applicant: Tencent Technology (Shenzhen) Company Limited, Shenzhen (CN)

(72) Inventor: Min Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/207,473

(22) Filed: Mar. 19, 2021

(65) Prior Publication Data

US 2021/0205705 A1 Jul. 8, 2021

Related U.S. Application Data

(63) Continuation of application No. 16/546,000, filed on Aug. 20, 2019, now Pat. No. 10,981,062, which is a
(Continued)

(51) Int. Cl.
*A63F 13/533* (2014.01)
*A63F 13/2145* (2014.01)
(Continued)

(52) U.S. Cl.
CPC ........ *A63F 13/533* (2014.09); *A63F 13/2145* (2014.09); *A63F 13/5375* (2014.09); *G06F 3/0482* (2013.01); *G06F 3/0485* (2013.01)

(58) Field of Classification Search
CPC ................ A63F 13/533; A63F 13/2145; A63F 13/5375; G06F 3/0482; G06F 3/0485
See application file for complete search history.

(56) References Cited

U.S. PATENT DOCUMENTS

| 10,139,906 B1* | 11/2018 | Bai | .................... G06F 3/014 |
| 2009/0143141 A1* | 6/2009 | Wells | ................ G07F 17/3239 463/37 |

(Continued)

FOREIGN PATENT DOCUMENTS

| CN | 104965655 A | 10/2015 |
| CN | 105194871 A | 12/2015 |

(Continued)

OTHER PUBLICATIONS

Tencent Technology, ISRWO, PCT/CN2017/095801, May 7, 2018, 7 pgs.
(Continued)

*Primary Examiner* — Steve Rowland
(74) *Attorney, Agent, or Firm* — Morgan, Lewis & Bockius LLP

(57) ABSTRACT

An electronic device with a display and a touch-sensitive surface displays an interaction region that includes one or more interaction objects. While displaying the interaction region, the device displays an effect selection panel that includes effect selection affordances that correspond to different predefined effects. In response to detecting a consecutive sequence of one or more inputs, the device selects a first effect selection affordance in accordance with a first contact, displays a first visual indication that indicates selection of the first effect selection affordance and identifies at least one interaction object as being linked to the first effect selection affordance; and applies the first effect to the identified interaction object in accordance with a termination of the first contact on the touch-sensitive surface while the first effect selection affordance remains selected.

20 Claims, 23 Drawing Sheets

Related U.S. Application Data continuation of application No. PCT/CN2017/095801, filed on Aug. 3, 2017.

(51) Int. Cl.
    *A63F 13/5375*     (2014.01)
    *G06F 3/0482*     (2013.01)
    *G06F 3/0485*     (2022.01)

(56) References Cited

U.S. PATENT DOCUMENTS

| | | | | |
|---|---|---|---|---|
| 2009/0289900 | A1* | 11/2009 | Lavski | A63F 13/10 345/173 |
| 2010/0321319 | A1* | 12/2010 | Hefti | G06F 3/04883 345/173 |
| 2011/0107268 | A1* | 5/2011 | Scherk | G06F 9/451 715/845 |
| 2012/0021833 | A1* | 1/2012 | Boch | A63F 13/814 463/36 |
| 2013/0185636 | A1* | 7/2013 | Lim | H04N 21/47 715/716 |
| 2014/0098050 | A1* | 4/2014 | Endo | G06F 1/169 345/173 |
| 2014/0357356 | A1 | 12/2014 | Horie | |
| 2015/0135108 | A1* | 5/2015 | Pope | G06V 40/12 715/767 |
| 2015/0301697 | A1* | 10/2015 | Petrell | G06F 3/0485 715/810 |
| 2017/0092038 | A1* | 3/2017 | Vann | G07F 17/3244 |

FOREIGN PATENT DOCUMENTS

| | | |
|---|---|---|
| CN | 106293487 A | 1/2017 |
| CN | 105582674 A | 5/2018 |

OTHER PUBLICATIONS

Tencent Technology, IPRP, PCT/CN2017/095801, Feb. 4, 2020, 5 pgs.

\* cited by examiner

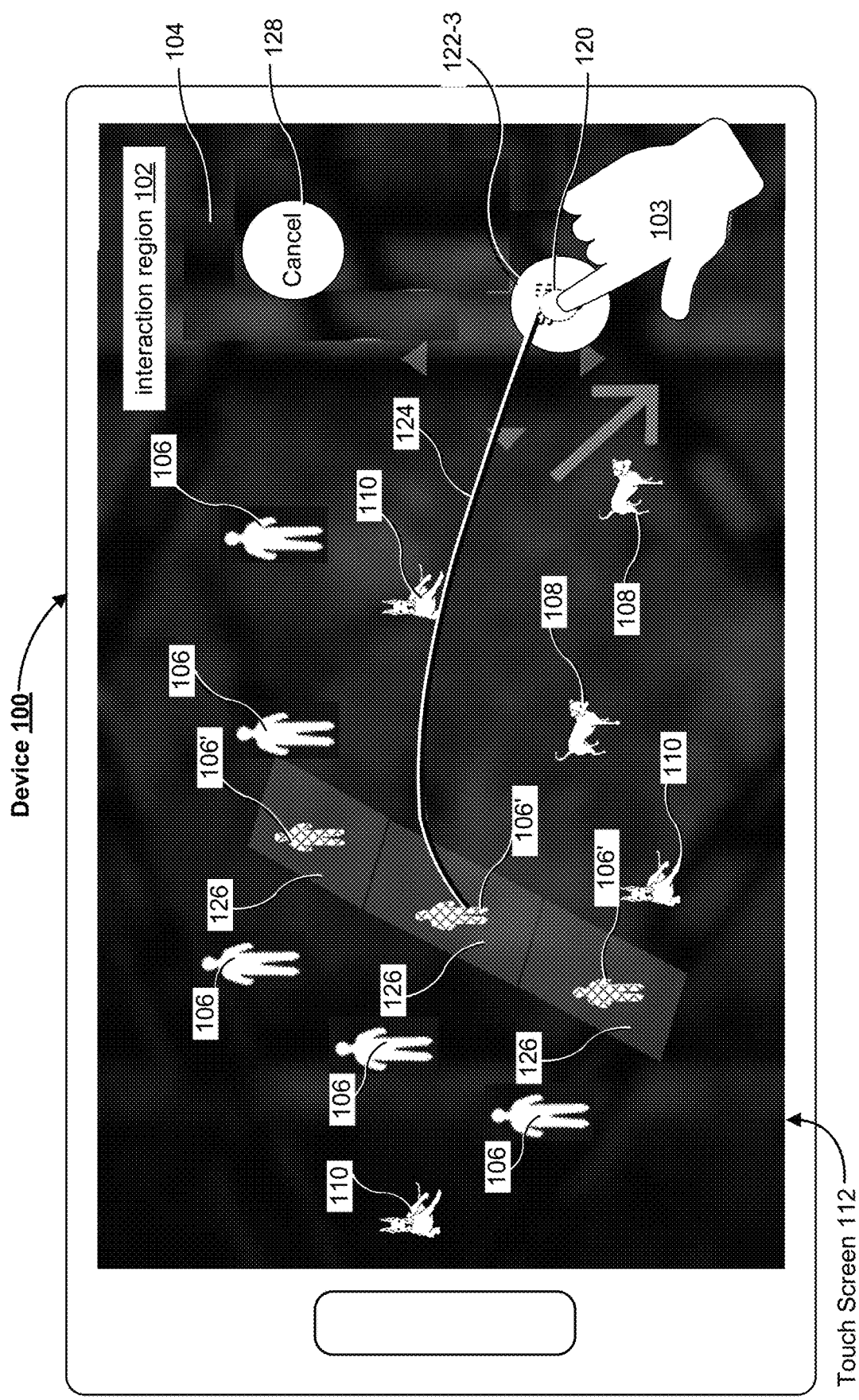

(A)

---

310 Prior to displaying the effect selection panel, display, in the user interface of the first application, a panel-display affordance, wherein the panel-display affordance corresponds to the effect selection panel, wherein:

detecting the sequence of one or more inputs includes detecting the first contact at a location on the touch-sensitive surface that corresponds to the panel-display affordance, and detecting first movement of the first contact from the location that corresponds to the panel-display affordance to the first location that corresponds to the first effect selection affordance; and the effect selection panel is displayed in response to detecting the first contact at the location on the touch-sensitive surface that corresponds to the panel-display affordance

---

312 In response to detecting the sequence of one or more inputs:

in accordance with the determination that the sequence of one or more inputs meets the effect selection criteria with respect to the first effect selection affordance of the plurality of selection affordances, display a third visual indication that indicates at least one target object of the first effect that corresponds to the first effect selection affordance, wherein the at least one target object is selected from one or more objects currently visible in the interaction region in accordance with predefined target selection criteria corresponding to the first effect

314 Displaying the second visual indication to indicate adjustment of the effect position corresponding to the first effect in accordance with the movement of the first contact from the first location to the second location includes one or more of:

(1) moving a line of effect corresponding to the first effect in accordance with the movement of the first contact from the first location to the second location;

(2) changing a size and/or location of a zone of effect corresponding to the first effect in accordance with the movement of the first contact from the first location to the second location; and (3) changing an identity and/or count of the currently selected targets for the first effect in accordance with the movement of the first contact from the first location to the second location

---

316 The effect selection criteria include a criterion that is met when the first contact is detected at the first location on the touch-sensitive surface that corresponds to the first effect selection affordance

---

318 Detecting the sequence of one or more inputs includes detecting initial movement of the first contact while the effect selection panel is displayed, and the effect selection criteria include a criterion that is met when an initial movement of the first contact causes the first effect selection affordance to be moved from an initial display location of the first effect selection affordance across the display to a predefined affordance selection region of the effect selection panel

320 Detecting the sequence of one or more inputs include detecting initial movement of the first contact while the effect selection panel is displayed, and the method includes:

in response to detecting the initial movement of the first contact:

in accordance with a determination that the initial movement of the first contact meets first movement criteria, scrolling the plurality of effect selection affordances in the effect selection panel in a first scroll direction; and in accordance with a determination that the initial movement of the first contact meets second movement criteria that are distinct from the first movement criteria, scrolling the plurality of effect selection affordances in the effect selection panel in a second scroll direction that is opposite the first scroll direction

---

322 Detecting the sequence of one or more inputs includes detecting lift-off of the first contact, and the method includes:

in response to detecting the lift-off of the first contact:

in accordance with a determination that effect application criteria are met with respect to the first effect by the sequence of one or more inputs, wherein the effect application criteria require that the lift-off of the first contact is detected while the first effect selection affordance is selected and while at least one target is currently identified in the interaction region for the first effect in order for the effect application criteria to be met with respect to the first effect, applying the first effect to the at least one target that is currently identified in the interaction region; and in accordance with a determination that effect cancelation criteria are met with respect to the first effect by the sequence of one or more inputs, wherein the effect cancelation criteria require that the lift-off of the first contact is detected while the effect application affordance is no longer selected or while no target is currently identified in the interaction region in order for the effect cancelation criteria to be met, forgoing application of the first effect that corresponds to the first effect selection affordance

Figure 3D

Device 100

DEVICES, METHODS, AND GRAPHICAL USER INTERFACES FOR PROVIDING GAME CONTROLS

CROSS-REFERENCE TO RELATED APPLICATIONS

This application is a continuation application of U.S. patent application Ser. No. 16/546,000, entitled "DEVICES, METHODS, AND GRAPHICAL USER INTERFACES FOR PROVIDING GAME CONTROLS", filed on Aug. 20, 2019, which is a continuation application of PCT/CN2017/095801, entitled "DEVICES, METHODS, AND GRAPHICAL USER INTERFACES FOR PROVIDING GAME CONTROLS" filed on Aug. 3, 2017, which is incorporated by reference in its entirety.

TECHNICAL FIELD

This relates generally to electronic devices with touch-sensitive surfaces, including but not limited to portable electronic devices with touch-sensitive surfaces for providing game controls, and more specifically, for selecting and applying various effects to game objects displayed in an interaction region of a game.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display.

Gaming on mobile computing devices have also become more popular as devices with touch-screen displays are becoming more prevalent. Some games allow a player to cause changes (e.g., changes in characteristics, appearances, abilities, statuses, etc.) to certain game objects (e.g., characters, inanimate objects, items, creatures, etc.) present in a game environment (e.g., a virtual game scene), by selecting and applying certain effects to the game objects (e.g., releasing an attack, taking an action, casting a spell, applying a healing potion, using a skill, etc.).

But methods for providing game controls, in particular, methods for selecting and applying effects to game objects are cumbersome and inefficient. For example, using a sequence of tap inputs to display, browse through, and select one or more user interface objects (e.g., effect selection affordances and target objects) and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with improved methods and interfaces for providing game controls (e.g., selecting and applying effects on game objects). Such methods and interfaces optionally complement or replace conventional methods for providing game controls. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include game playing. Executable instructions for performing these functions are, optionally, included in a non-transitory computer readable storage medium or other computer program product configured for execution by one or more processors.

In accordance with some embodiments, a method is performed at a device having a display and a touch-sensitive surface. The method includes: displaying a user interface of a first application, the user interface including an interaction region that includes one or more interaction objects and an effect selection panel that includes a plurality of effect selection affordances that correspond to predefined effects that are applicable to one or more of the interaction objects currently displayed in the interaction region; detecting a sequence of one or more inputs, the sequence including a first contact on the touch-sensitive surface within the effect selection panel immediately followed by a movement of the first contact across the touch-sensitive surface from the effect selection panel to the interaction region immediately followed by a termination of the first contact on the touch-sensitive surface; and in response to detecting the sequence of one or more inputs: selecting a first effect selection affordance of the plurality of effect selection affordance in accordance with the first contact; displaying a first visual indication that indicates selection of the first effect selection affordance and identifying at least one of the interaction objects in the interaction region as being linked to the first effect selection affordance when the first effect selection affordance moves on the touch-sensitive surface in accordance with the movement from the effect selection panel to the interaction region while the first effect selection affordance remains selected; and applying the first effect to the at least one of the interaction objects that is currently identified in the interaction region in accordance with the termination of the first contact on the touch-sensitive surface while the first effect selection affordance remains selected.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for moving user interface objects thereby increasing the effectiveness, efficiency, and user satisfaction with such devices. Such methods and interfaces may complement or replace conventional methods for providing gaming controls, and providing object interaction, in general.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 3A-3D are flow diagrams illustrating a method of providing game controls, in accordance with some embodiments.

DESCRIPTION OF EMBODIMENTS

Conventional methods of providing game controls, in particular, of displaying effect selection affordances, browsing through multiple effect selection affordances, selecting an effect selection affordance, adjusting a target position of an effect corresponding to a selected effect selection affordance and applying the effect to one or more target objects displayed in the game environment require separate gestures or inputs with different contacts detected at different times. The embodiments below integrate the different gestures such that the same contact may be used to provide the required inputs to accomplish multiple of the above operations. In particular, different criteria related to the location and movement of a single contact, and optionally in conjunction with the state of the user interface (e.g., the game environment) at the time that various inputs by the single contact are detected are used to determine the responses of the user interface and the actions that will take place in the user interface.

Example Devices, User Interfaces and Associated Processes

Figure 1A:
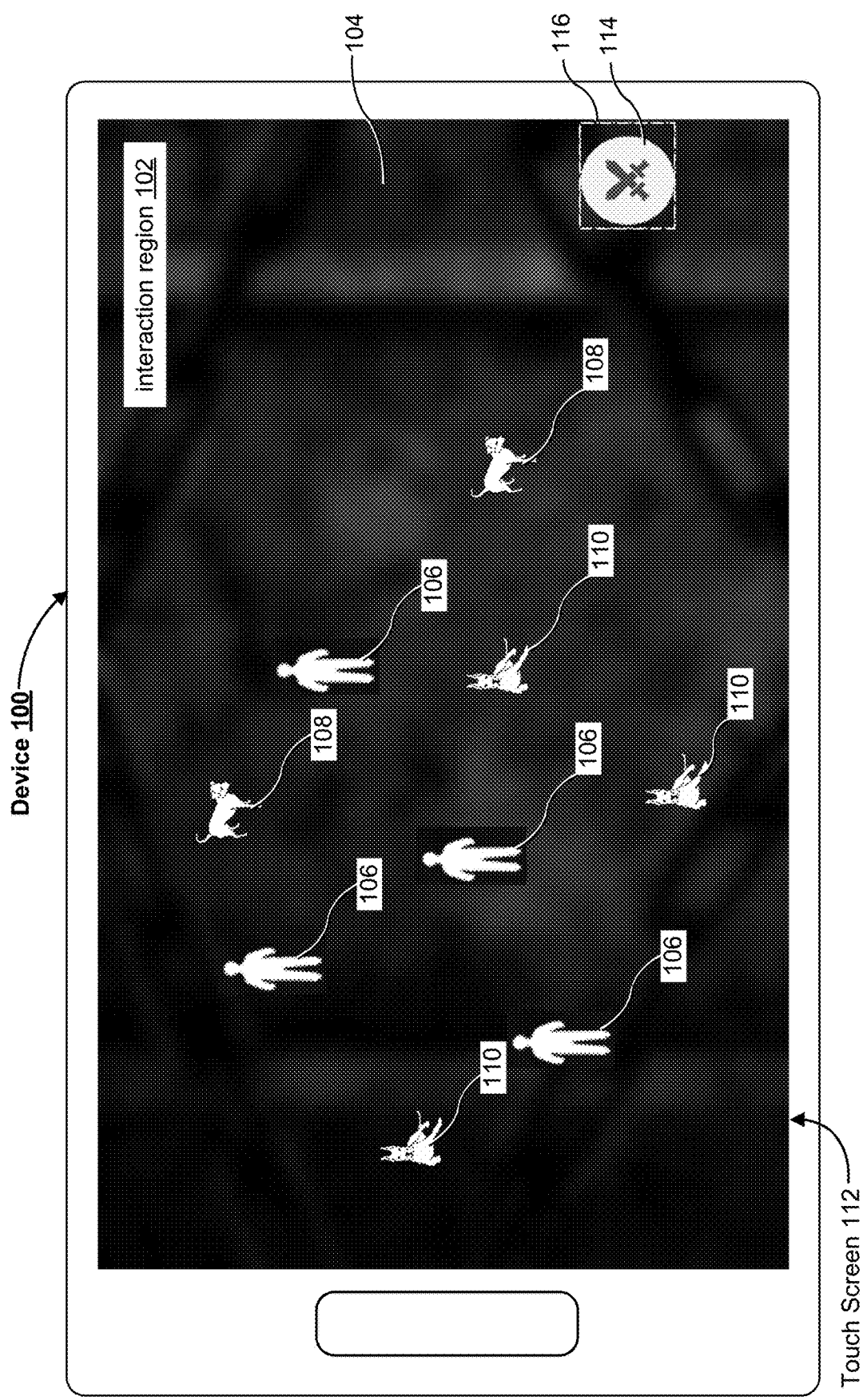
FIGS. 1A-1Q illustrate example user interfaces for providing game controls (e.g., displaying, browsing, selecting, and applying an effect on one or more game objects using inputs provided by a single continuously maintained contact), in accordance with some embodiments.
Figure 1B:
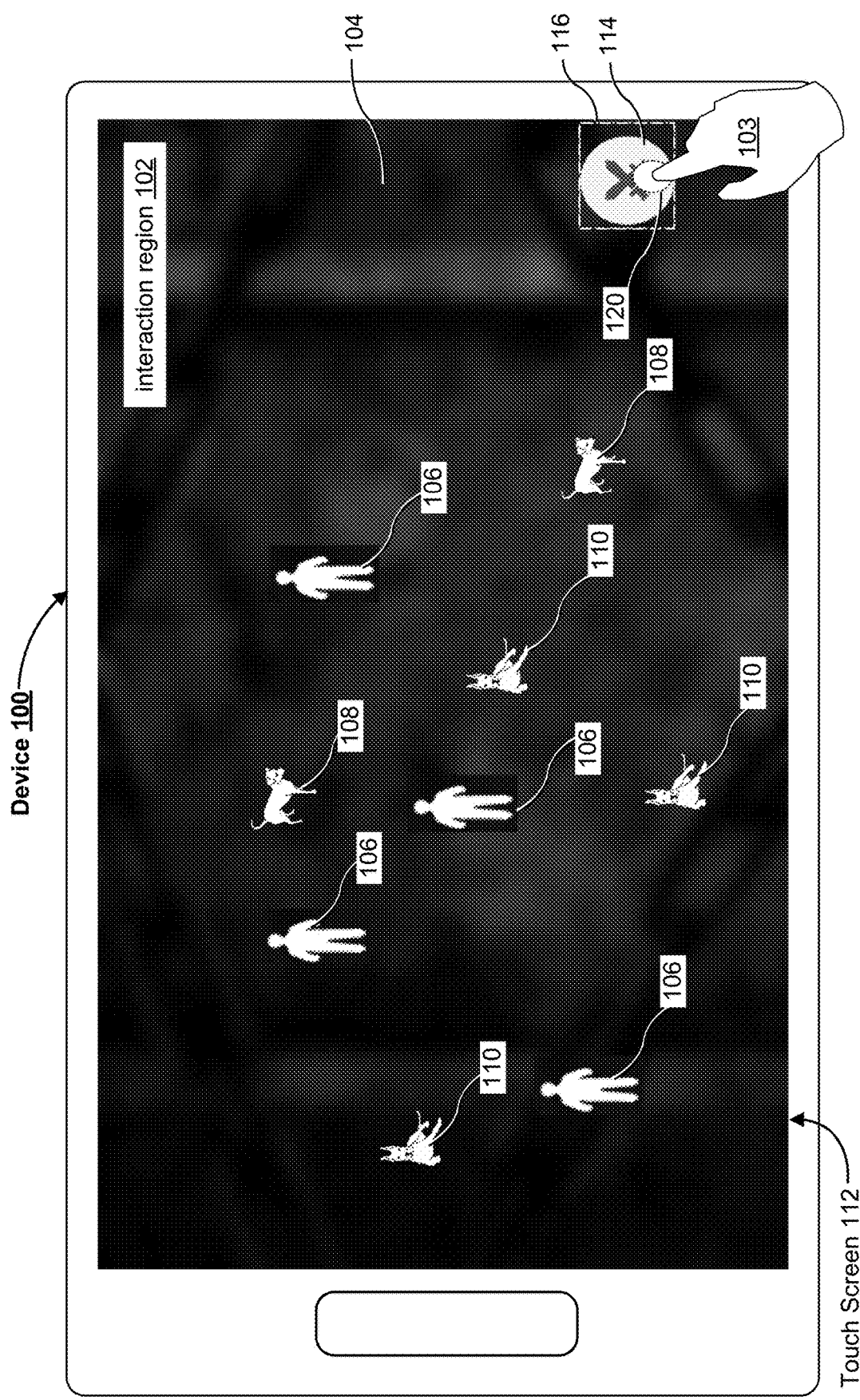
Figure 1C:
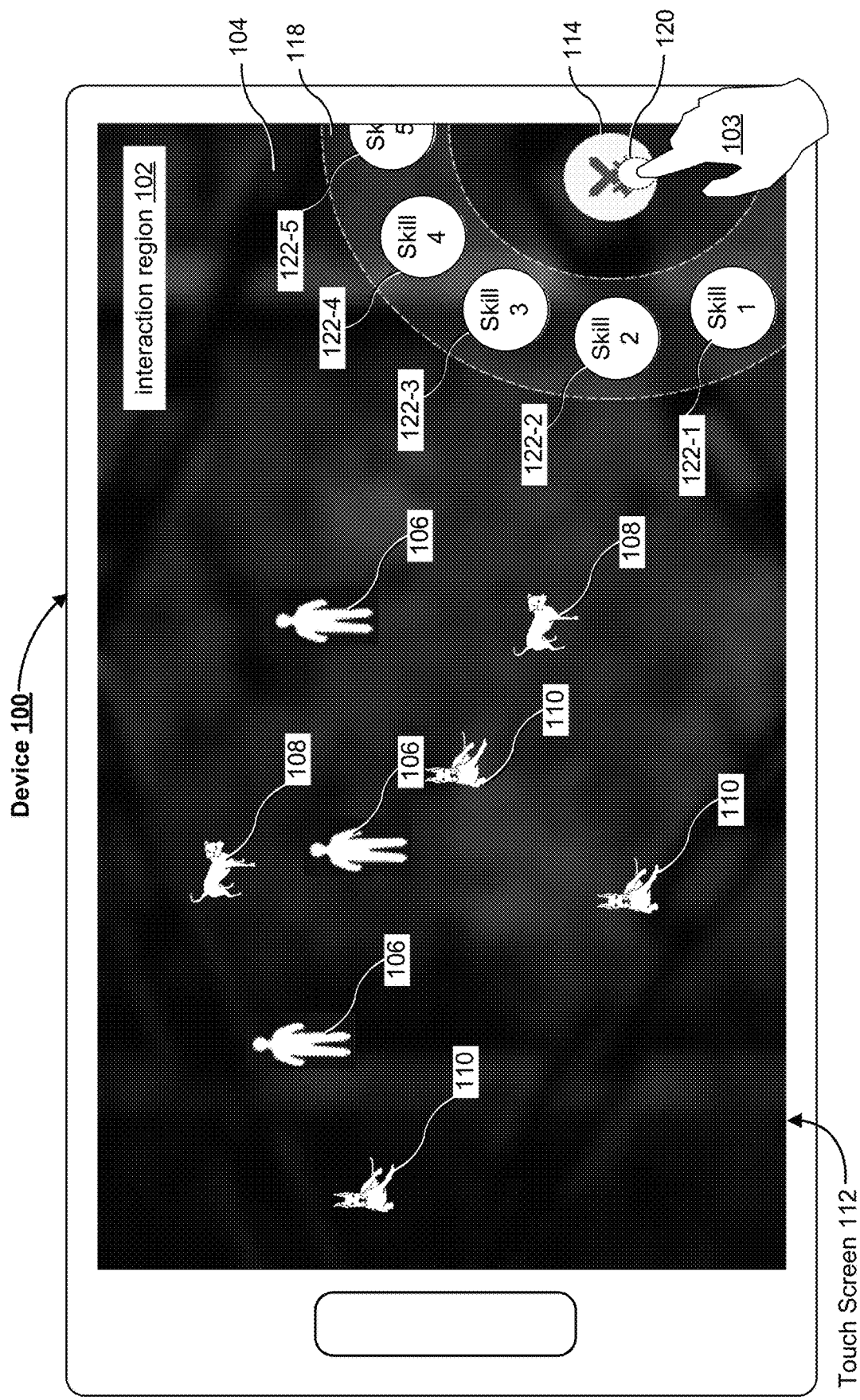
Figure 1D:
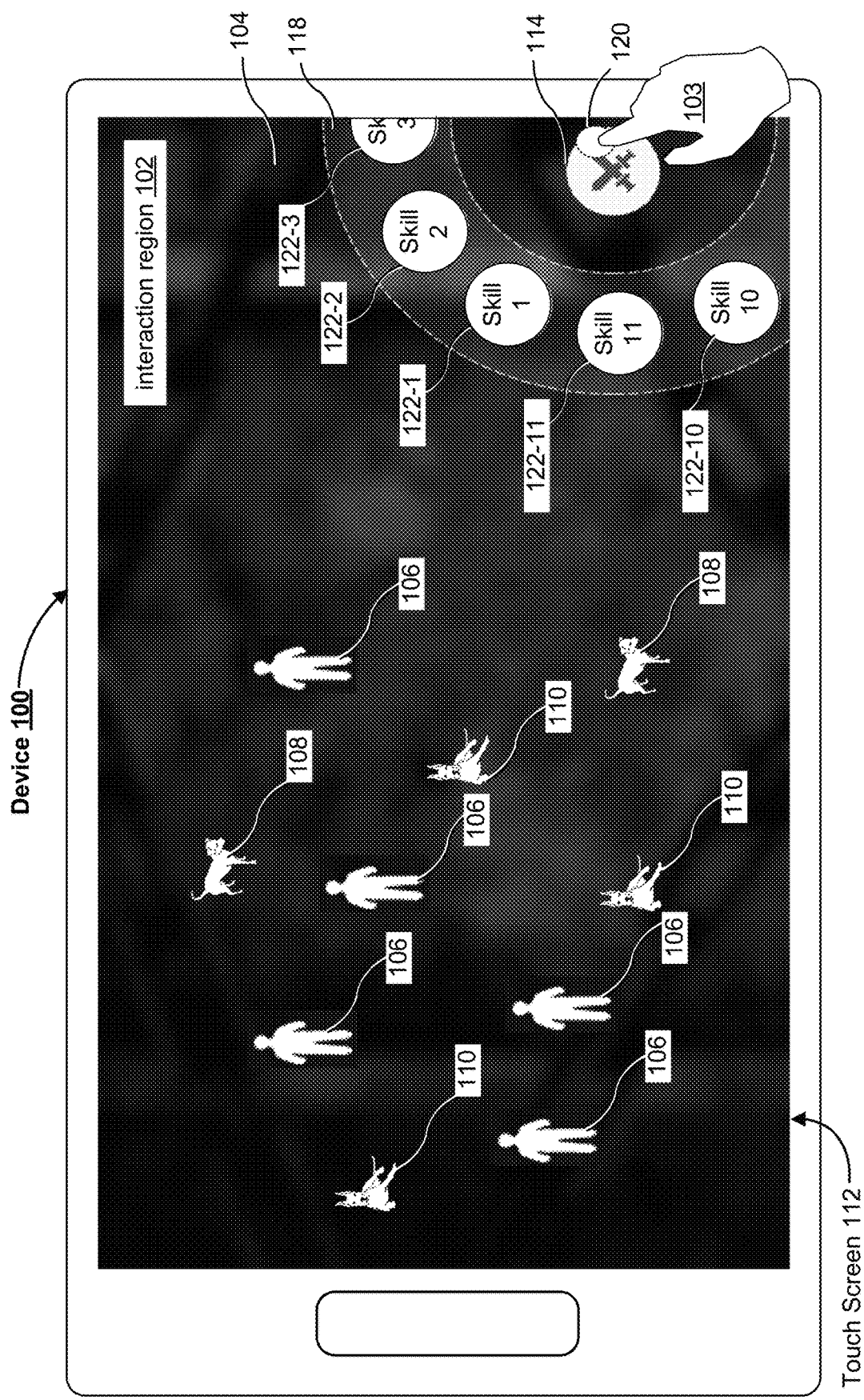
Figure 1E:
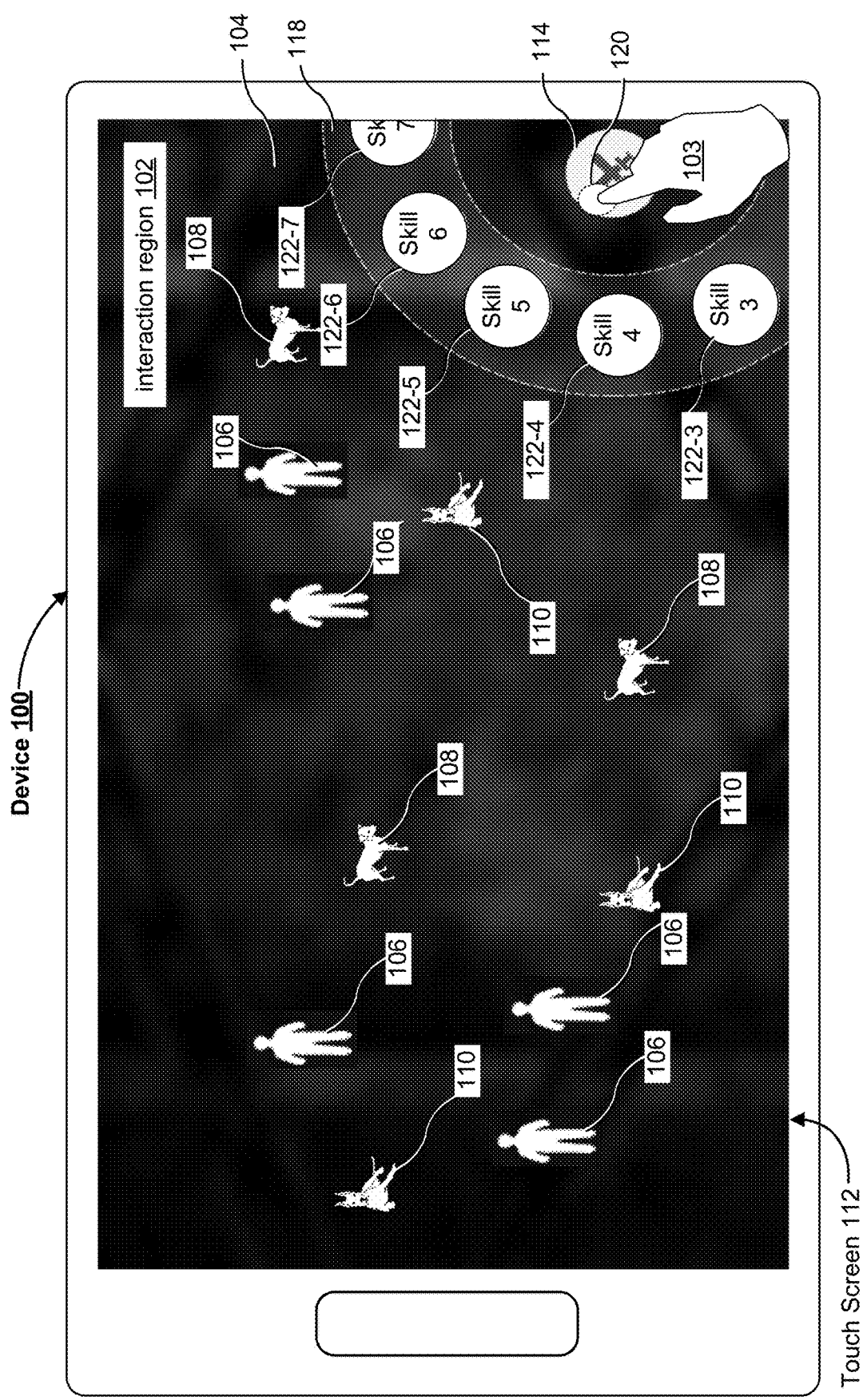
Figure 1F:
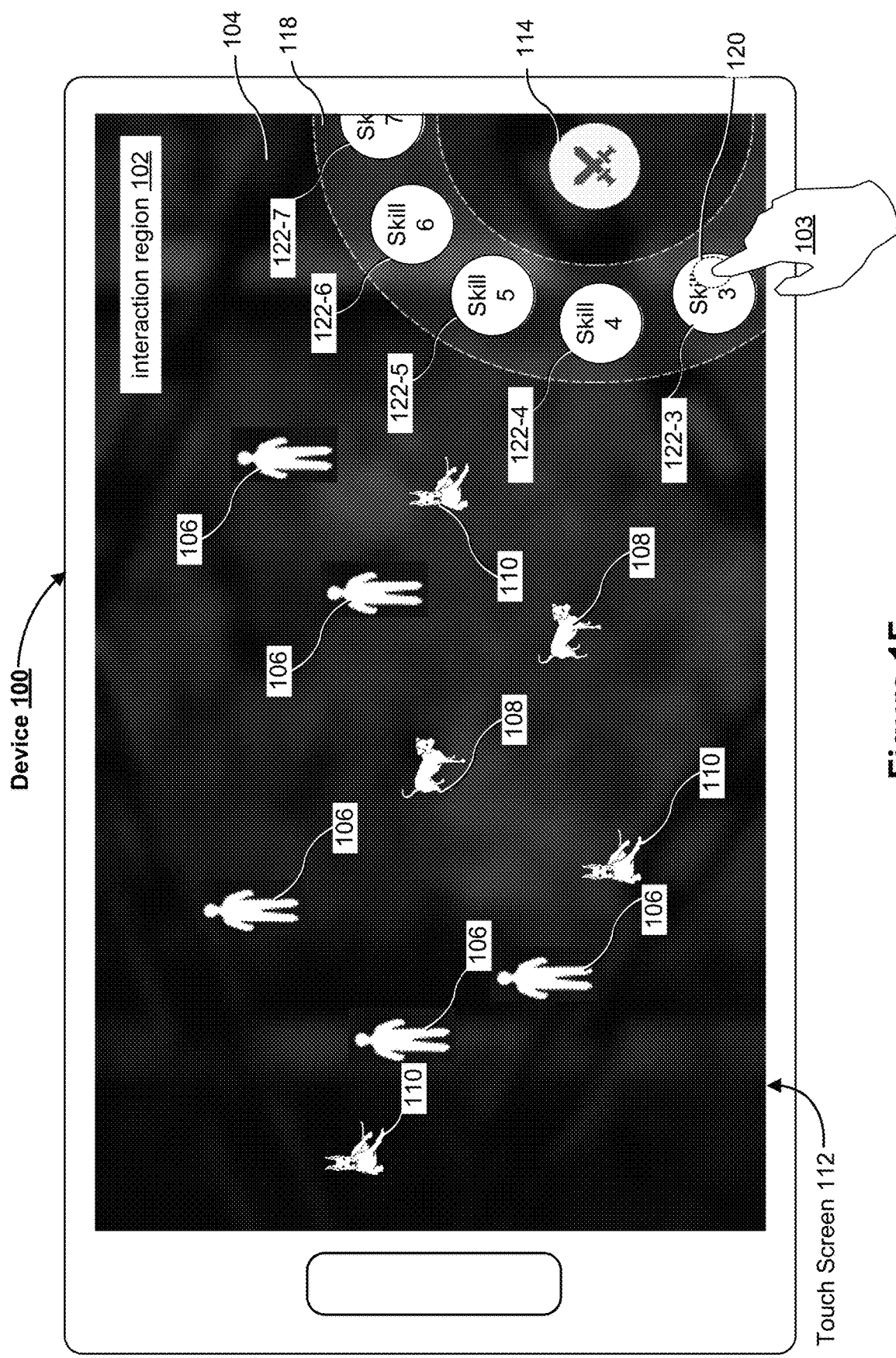
Figure 1G:
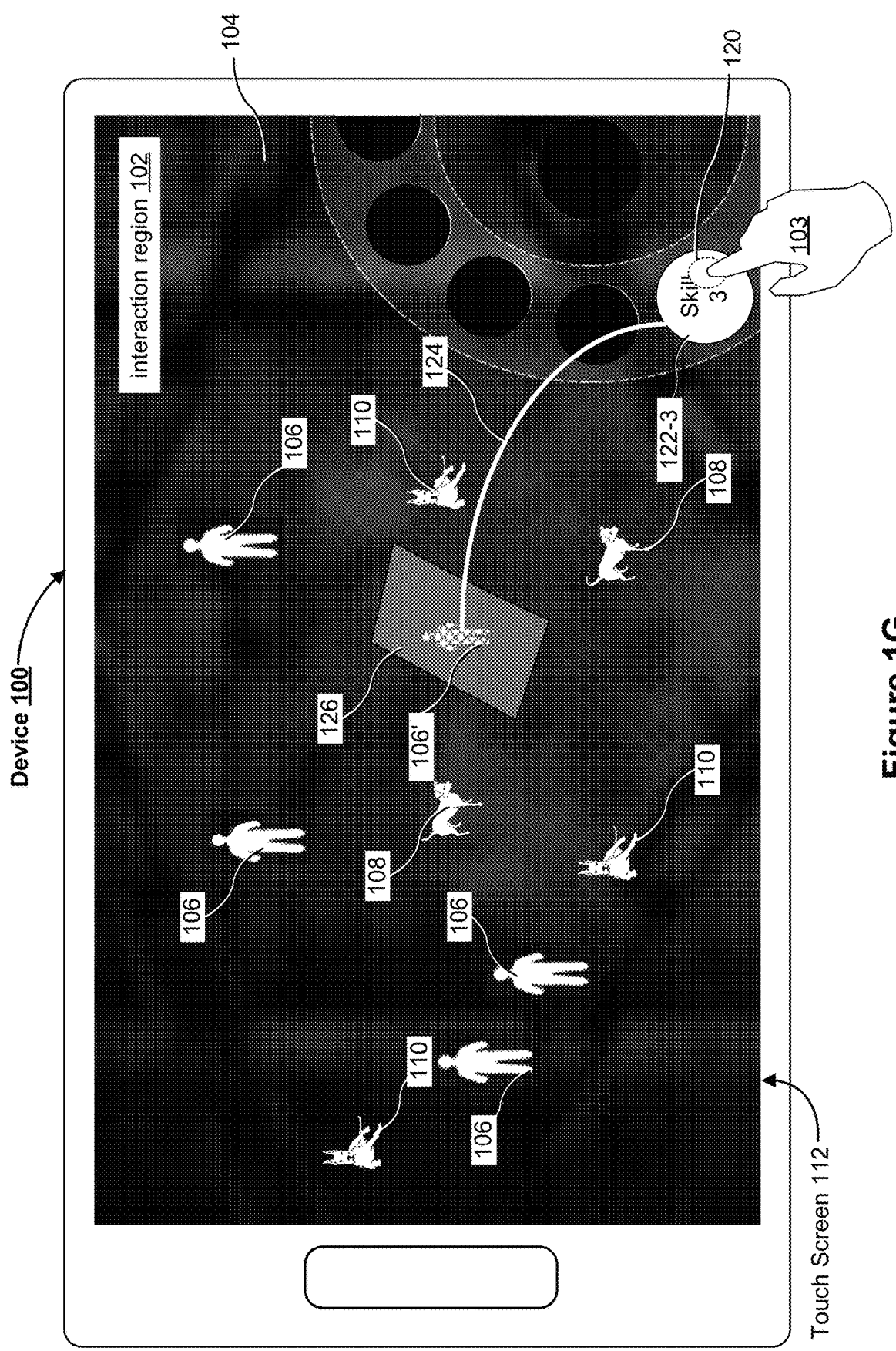
Figure 1H:
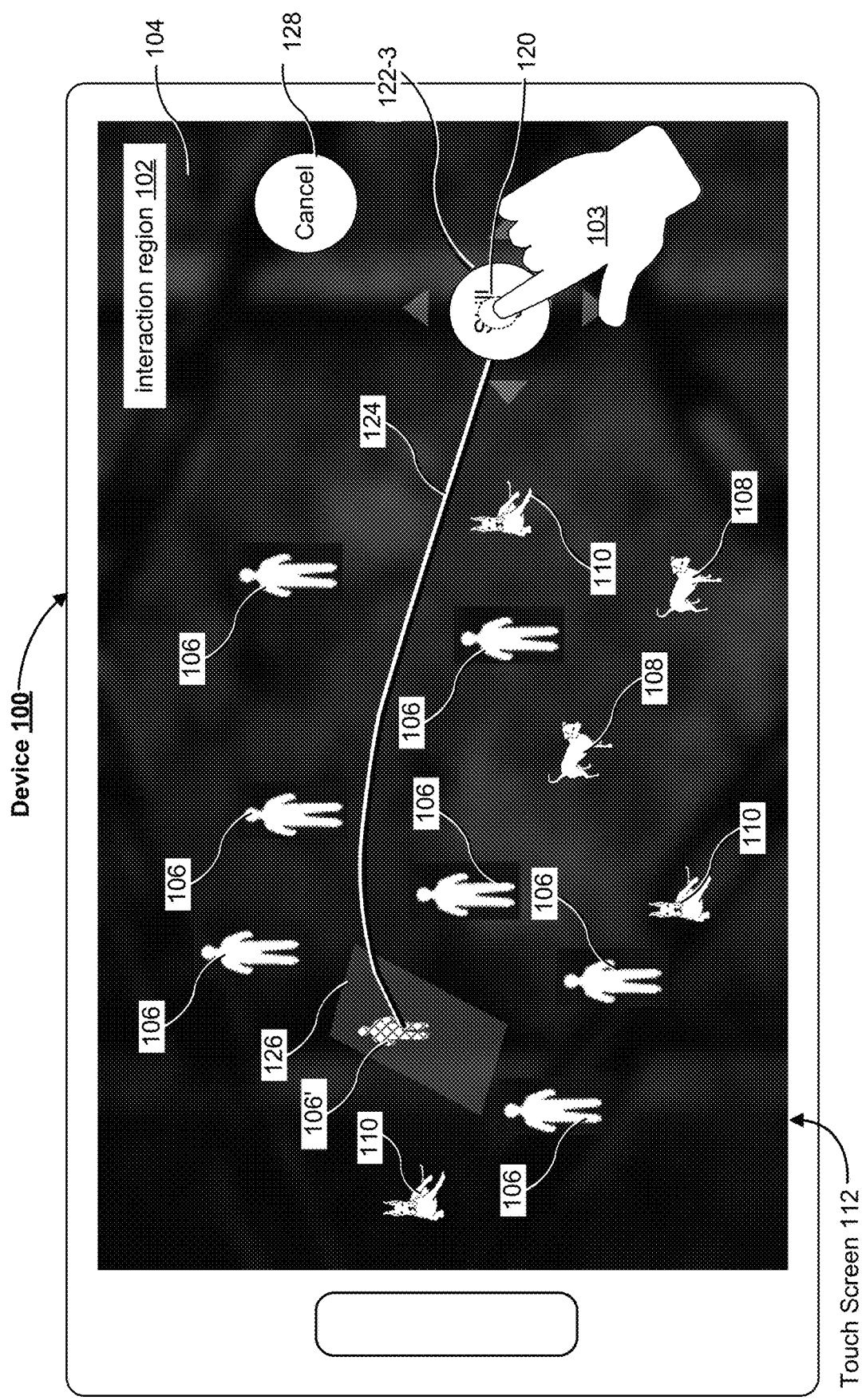
Figure 1I:
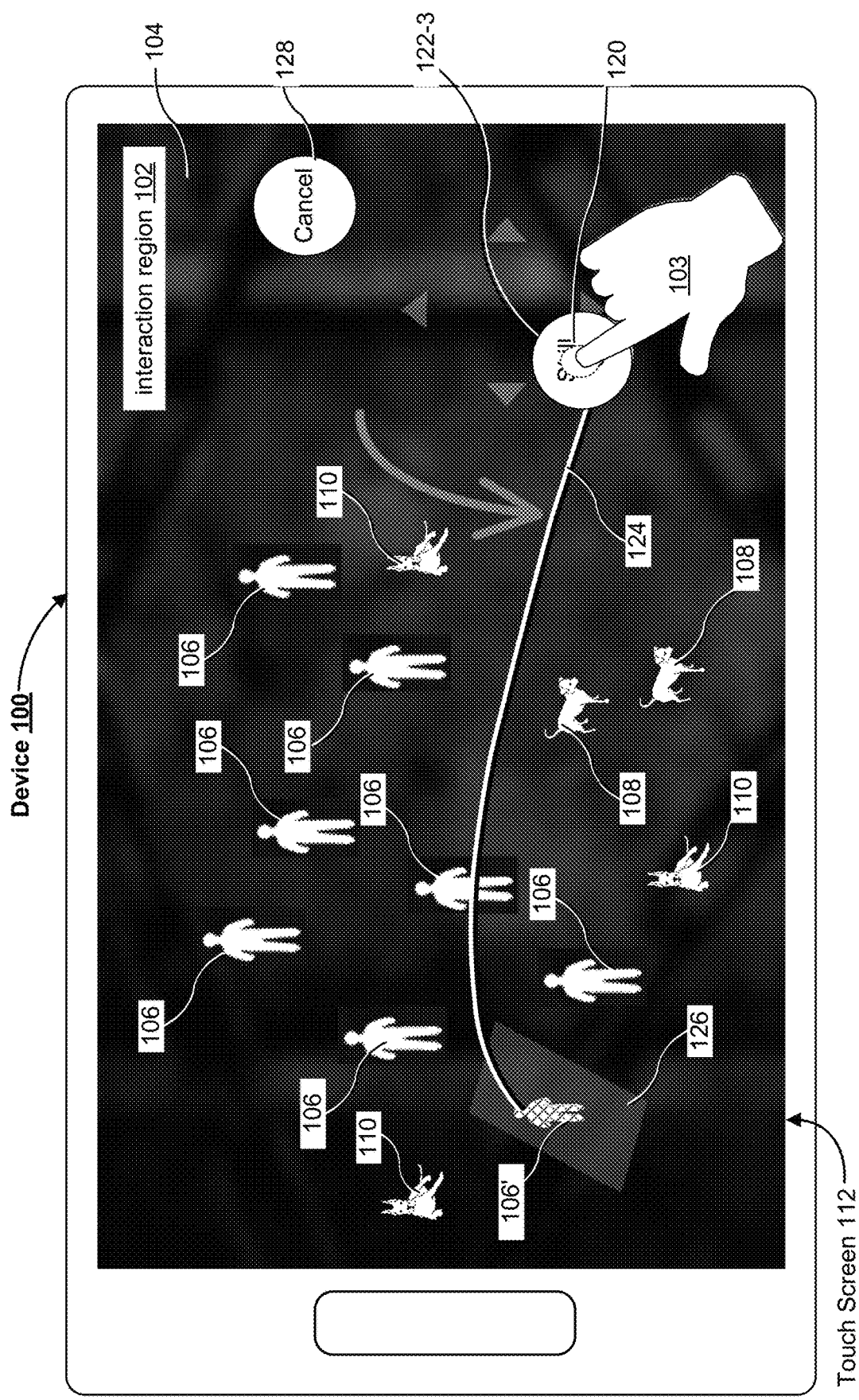
Figure 1J:
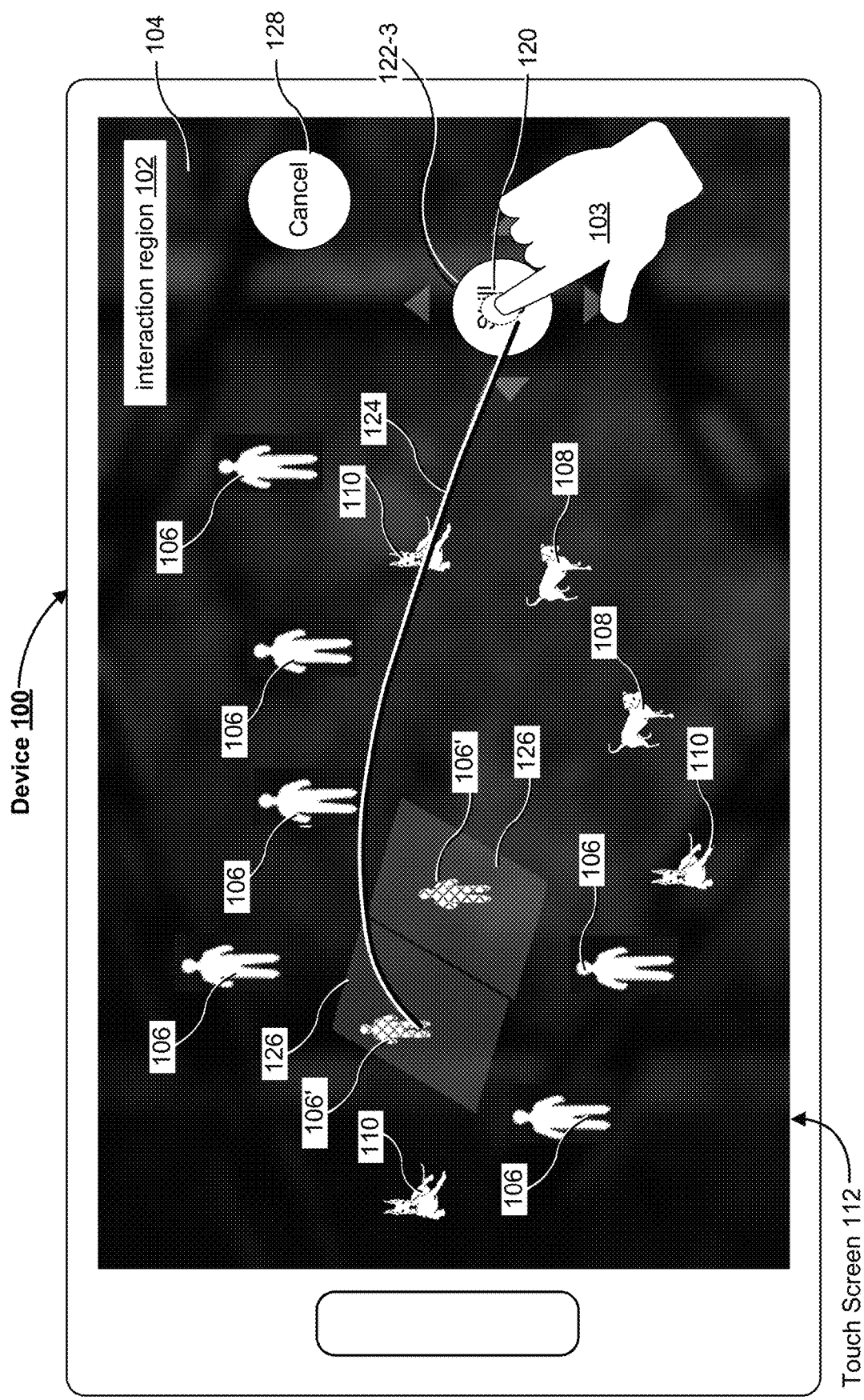
Figure 1K:
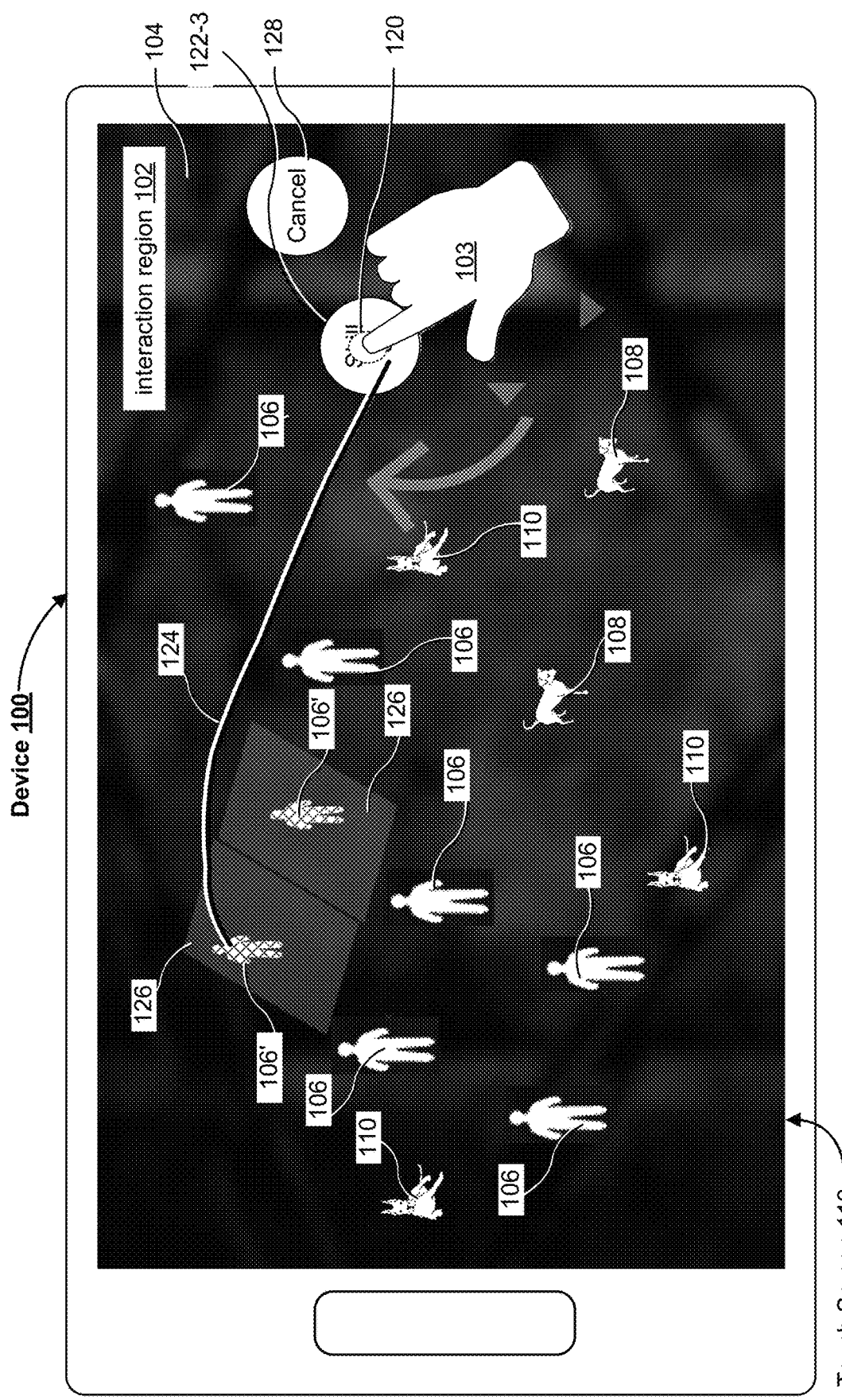
Figure 1L:
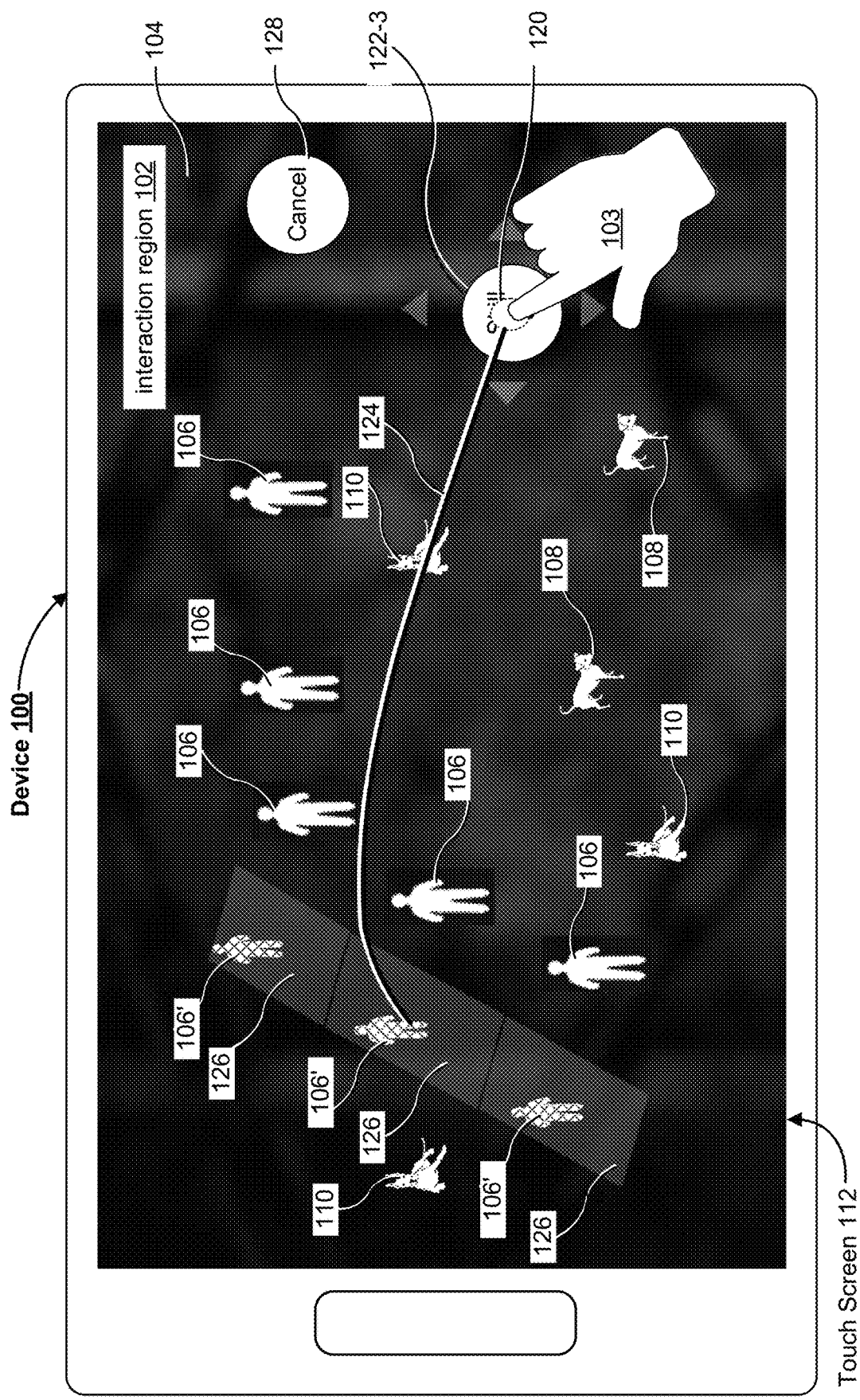
Figure 1N:
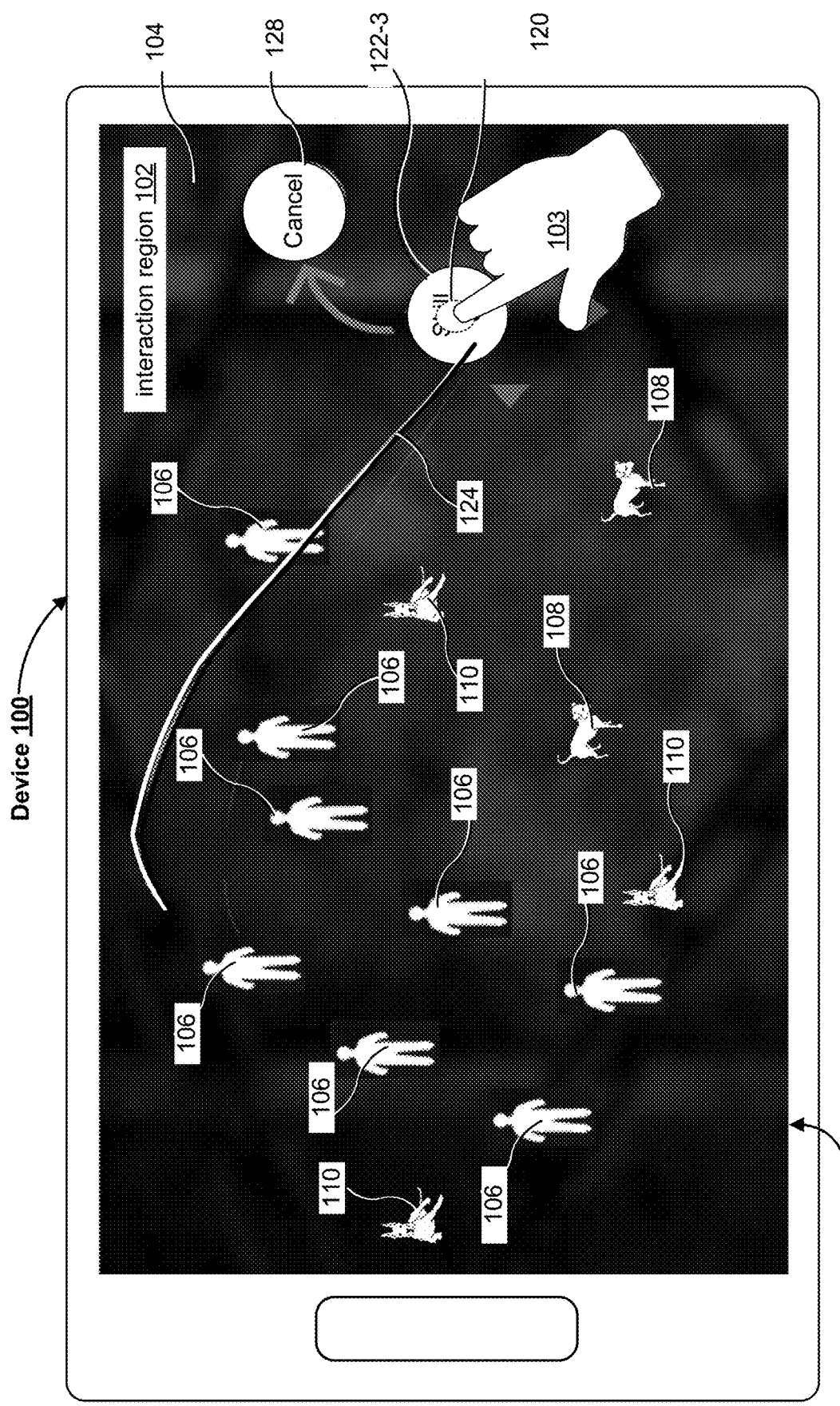
Figure 10:
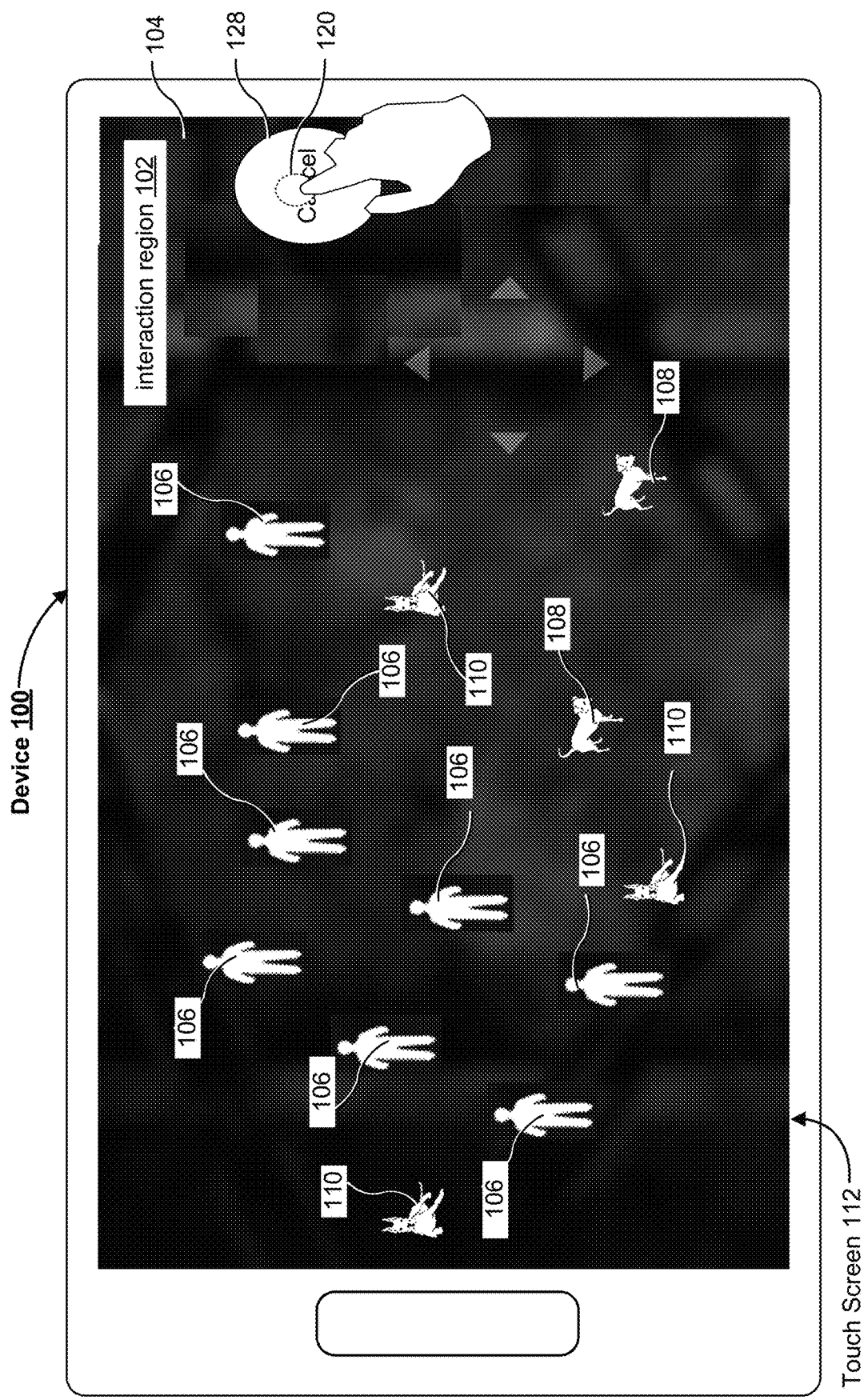
Figure 1P:
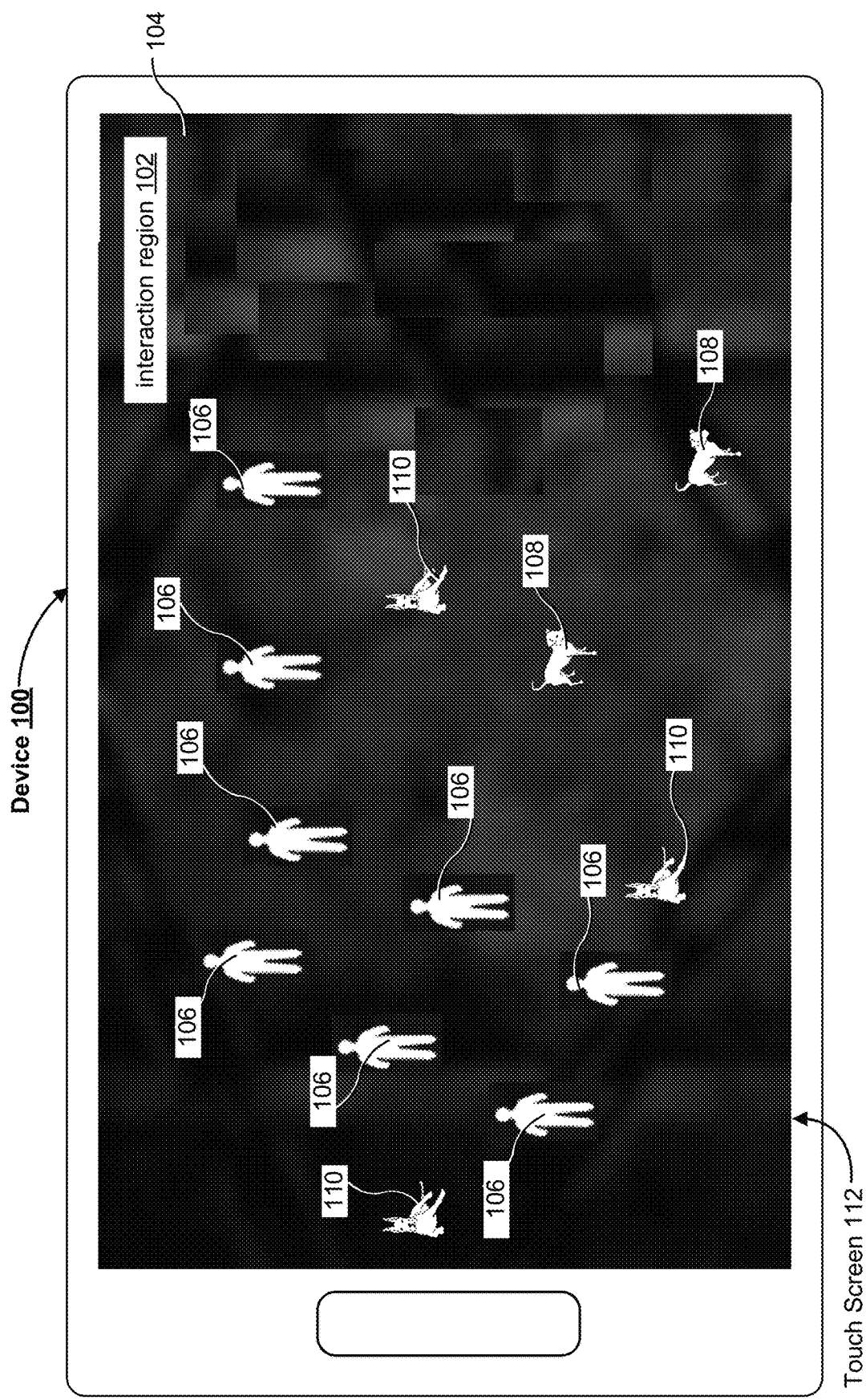

FIGS. 1A-1P illustrate example user interfaces for interacting with a user interface (e.g., displaying, browsing, selecting effect selection affordances, and adjusting and applying a selected effect to one or more targets or cancelling a selected effect before it is applied) in response to touch inputs, in accordance with some embodiments. The user interfaces in these figures are used to illustrate the processes described below, including the processes in FIGS. 2 and 3A-3D. For convenience of explanation, some of the embodiments will be discussed with reference to operations performed on a device with a touch-sensitive display system (e.g., touch screen 112). In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display and a separate touch-sensitive surface (e.g., a touch-pad) in response to detecting the contacts on the touch-sensitive surface while displaying the user interfaces shown in the figures on the display, along with a focus selector. FIG. 3 illustrates components of an exemplary computing device 100, in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

Figure 4:
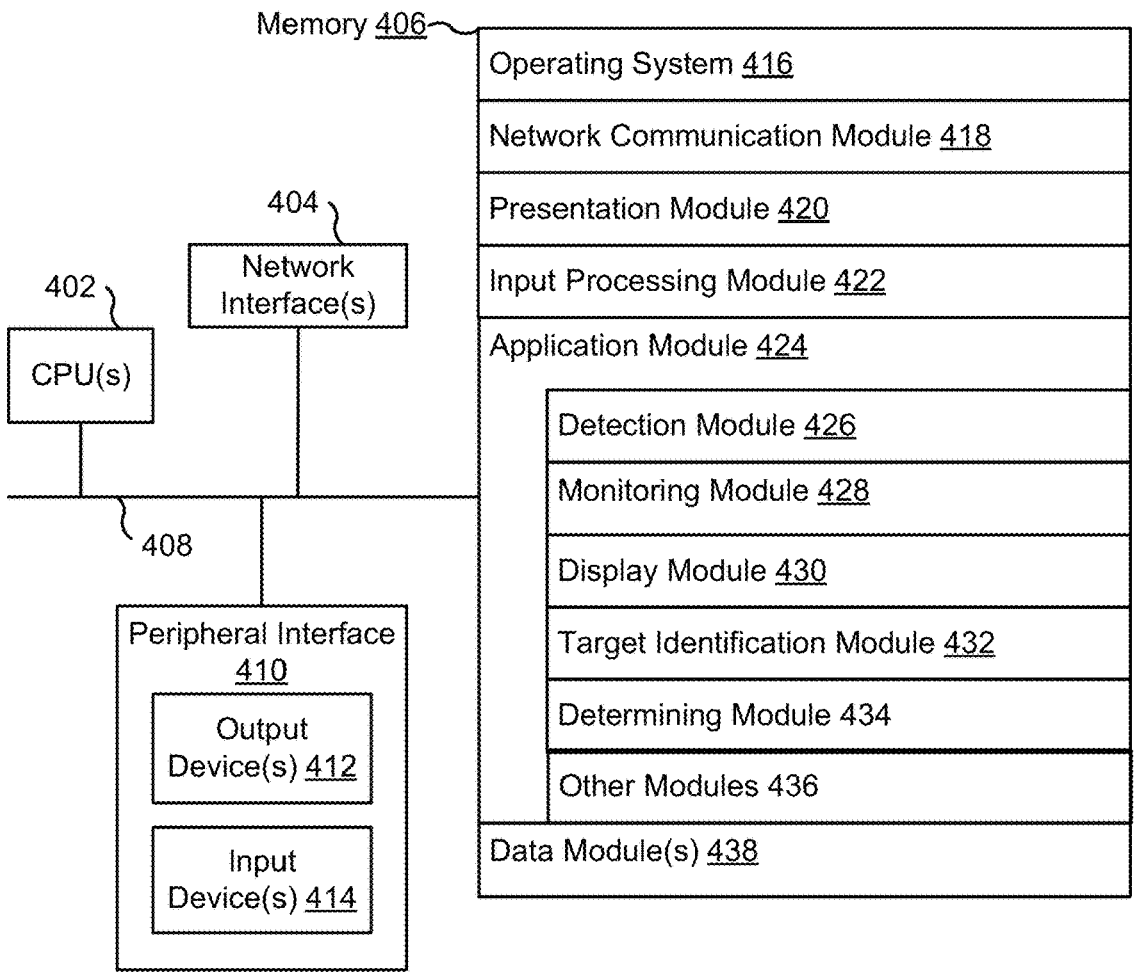
FIG. 4 illustrates a portable multifunction device with a touch-sensitive display system in accordance with some embodiments.

FIGS. 1A and 4 illustrates portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 406 (which optionally includes one or more computer readable storage mediums), a memory controller, one or more processing units (CPUs), and one or more of the following: peripherals interface, RF circuitry, audio circuitry, speakers, microphones, input/output (I/O) subsystems, other input or control devices, and external ports. Device 100 optionally includes one or more optical sensors. Device 100 optionally includes one or more intensity sensors for detecting intensities of contacts on device 100 (e.g., a touch-sensitive surface such as touch-sensitive display system 112 of device 100). Device 100 optionally includes one or more tactile output generators for generating tactile outputs on device 100 (e.g., generating tactile outputs on a touch-sensitive surface such as touch-sensitive display system 112 of device 100 or touchpad of device 100). These components optionally communicate over one or more communication buses or signal lines (e.g., bus 408). It should be appreciated that device 100 is only one example of a portable multifunction device, and that device 100 optionally has more or fewer components than shown, optionally combines two or more components, or optionally has a different configuration or arrangement of the components. The various components disclosed herein are implemented in hardware, software, firmware, or a combination thereof, including one or more signal processing and/or application specific integrated circuits.

Memory 406 of device 100 optionally includes high-speed random access memory and optionally also includes non-volatile memory, such as one or more magnetic disk storage devices, flash memory devices, or other non-volatile solid-state memory devices. Access to memory 406 of device 100 by other components of device 100, such as the CPU(s) 402 and the peripherals interface 410, is, optionally, controlled by the memory controller. The peripherals interface can be used to couple input and output peripherals (e.g., output devices 412 and input devices 414) of the device to the CPU(s) and memory. The one or more processors run or execute various software programs and/or sets of instructions stored in the memory to perform various functions for device 100 (e.g., operating system module 416 for providing basic operating system functions, network communication module 418 for providing network communications, presentation module 420 for presenting information to the user, application module 424 for providing application functions, such as providing gaming functions of a gaming application on the device (e.g., including detection module 426 for detecting events (e.g., user inputs, and events in the game progress) that occur within the application, monitoring module 428 for monitoring the detection and movement of the contacts, display module 430 for displaying the game environment, target identification module 432 for identifying target objects for a selected effect, determining module 434 for determining whether inputs meet predefined criteria, and other modules 436 for performing other functions of the game software as described herein)) and to process data (e.g., data modules 438).

The touch-sensitive display system 112 provides an input interface and an output interface between the device and a user. Touch-sensitive display system 112 displays visual output to the user. In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and the display controller (along with any associated modules and/or sets of instructions in the memory of device 100) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 optionally also includes one or more contact intensity sensors. Contact intensity sensor(s) receive contact intensity information (e.g., pressure information or a proxy for pressure information) from the environment. In some embodiments, at least one contact intensity sensor is collocated with, or proximate to, a touch-sensitive surface (e.g., touch-sensitive display system 112).

In some embodiments, the software components stored in the memory of device 100 include contact/motion module (or set of instructions), and applications (or sets of instructions). The contact/motion module optionally detects contact with touch-sensitive display system 112 (in conjunction with the display controller) and other touch-sensitive devices (e.g., a touchpad or physical click wheel). The contact/motion module includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). The contact/motion module receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, the contact/motion module and the display controller detect contact on a touchpad. The contact/motion module optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses.

While the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input).

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. Intensity of a contact is, optionally, determined (or measured) using various approaches and various sensors or combinations of sensors. In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

FIG. 1A illustrates a user interface (e.g., game user interface 104) of an application (e.g., a gaming application) that executes on device 100. User interface 104 of the gaming application includes an interaction region 102 (e.g., a virtual game environment, such as an animated game scene in which one or more game objects are present) that occupies all or a sub-portion of game user interface 104. In some embodiments, as shown in FIG. 1A, during active gameplay, interaction region 102 is displayed in a full-screen content display mode or full-screen gaming mode, and system or application controls (e.g., device status bars, system or application menus, etc.) are not visible on touch-screen 112. In some embodiments, interaction region 102 is displayed as part of the user interface, e.g., inside a window, concurrently with other system or application controls.

In FIG. 1A, a plurality of game objects (e.g., game characters, creatures, and inanimate objects, items, etc.) are displayed in interaction region 102 (e.g., in a virtual game environment or above a game background). Using a role-playing game as an example, the game objects includes various creatures and game characters that are controlled by instructions received from device 100, one or more remote servers, and/or devices of other players. The player that controls device 100 can interact with the game environment and change the states or statuses of the game objects by applying various effects to one or more of the game objects. An effect is applied to a target object (or a group of target objects or region in the game environment) in accordance with an action, a skill, a spell, a status, an attack, use of an item, etc. that is available to the player in the current game context, and that is selected and applied by the player. As a result of the application of the effect, the targeted objects may change their statuses based on the game rules, e.g., be killed, experience reduced or enhanced abilities, be healed, incur damages, be transported, be multiplied, etc.

Conventionally, in order to apply an effect, the player is often required to pause the game progress (e.g., suspend the animation and story development in the game environment), open a menu to see available options for actions that can be taken, select an option that corresponds to a desired action, select one or more target object for the selected action, and then activate the action to apply its effect on the selected target(s). Frequently, multiple steps by multiple gestures with different contacts are required to accomplish this series of tasks, and user experience is poor on battery-operated devices and user's enjoyment of the game is diminished due to the cumbersome controls of provided by the conventional methods. As disclosed herein, a single continuously maintained contact is used to provide a sequence of multiple inputs, to accomplish multiple of the above operations without lift-off of the contact. Extensive menus are not required during all stages of the process, thus, reducing visual clutter and reducing user confusion when interacting with the game.

As shown in FIG. 1A, in addition to the plurality of game objects (e.g., hostile characters 106, friendly characters 108, and neutral characters 110) that are displayed in the interaction region 102, a panel display affordance (e.g., button 114 for triggering display of an effect selection panel, such as a weapon selection panel, a skill selection panel, an action selection panel, an item selection panel, and/or a game character selection panel, etc.) is displayed overlaid on interaction region 102. In some embodiments, button 114 is not displayed until a contact is detected on touch-screen 112. In some embodiments, button 114 is displayed when the contact is maintained on the touch-screen with less than a threshold amount of movement for at least a threshold amount of time (e.g., after a touch-hold input by the contact is detected). In some embodiments, button 114 is displayed at a location on the touch-screen in accordance with the touch-down location of the contact (e.g., directly below the contact or slightly offset from the contact). In some embodiments, button 114 is displayed at a predefined location in user interface 104, either outside of the interaction region or overlaid on the interaction region. In some embodiments, button 114 has a corresponding reactive region 116, and a contact detected within the reactive region of button 114 activates the button, and causes display of a corresponding effect selection panel (e.g., effect selection panel 118 in FIG. 1C). In some embodiments, effect selection panel 118 remains displayed after lift-off of the contact (e.g., the effect selection panel 118 can be displayed in response to a tap input on button 114), and another tap input outside of effect selection panel 118 dismisses effect selection panel 118.

FIGS. 1A-1C illustrate that, in some embodiments, a contact (e.g., contact 120 by input object 103 (e.g., a finger)) is detected on touch-screen 112 at a location of button 114 (e.g., in FIG. 1B), and in response to detecting contact 120 on button 114, effect selection panel 118 (e.g., a skill selection panel) is displayed around contact 120. In some embodiments, effect selection panel 118 includes a plurality of effect selection affordances 122 representing different effects, such as skills, items, actions, attacks, etc. that are available for use in the current gaming context by the currently chosen character of the player. In some embodiments, a representation of the player (e.g., a character or avatar controlled by the player, or a weapon or vehicle that is currently controlled by the player, etc.) is also shown in interaction region 102. In FIG. 1C, effect selection panel 118 includes a circular menu of effect selection affordances 122 (e.g., skill selection affordances 122-1, 122-2, 122-3, 122-4, 122-5, etc. for different skills 1 through x). In some embodiments, a method for selecting a game character for the player is also provided in a similar manner as the effect selection process. Although FIGS. 1A-1C illustrate the contact 120 being detected after button 114 is already displayed, in some embodiments, if the button 114 is not already displayed, detecting contact 120 at a predefined location in the user interface 104 or detecting an input by the contact that meets button display criteria (e.g., a touch-hold requirement or a press requirement is met by the contact when no panel-display affordance is displayed) causes display of button 114. In some embodiments, lift-off of contact 120 is not required to display button 114, and when a subsequent input by contact 120 meets panel display criteria (e.g., another touch-hold requirement or another press requirement while button 114 is displayed), effect selection panel 118 is displayed. In some embodiments, the effect selection panel is arranged according to other formats, such as a grid or a list.

FIGS. 1C-1D illustrate that, while contact 120 is maintained on touch-screen 112 after effect selection panel 118 is displayed, movement of contact 120 across touch-screen 112 is detected. In some embodiments, as shown in FIG. 1D, movement in the upper right direction (northeast direction) of a reference location (e.g., the location of button 114 or the initial location of contact 120) causes effect selection panel 118 to scroll in a first direction (e.g., clockwise). FIGS. 1C-1E illustrate that, while contact 120 is maintained on touch-screen 112 after the effect selection panel is displayed, movement of contact 120 across the touch-screen 112 in the upper left direction (northwest direction) of the reference location causes effect selection panel 118 to scroll in a second direction (e.g., counterclockwise). In some embodiments, the movement of contact 120 can be a rotation around a centroid of contact 120, and a clockwise rotation of contact 120 causes the effect selection panel to scroll in a first direction (e.g., clockwise, or upward), and a counterclockwise rotation of contact 120 causes the effect selection panel to scroll in the opposite direction (e.g., counterclockwise, or downward). In some embodiments, the movement of contact 120 can be a rotation around a reference point outside of the contact 120, e.g., within the region enclosed by the inner boundary of the circular ring of effect selection affordances 122.

FIGS. 1F-1G illustrate that, movement away from button 114, e.g., after the scrolling of the effect selection panel by movement within the central region of the effect selection panel near button 114, to a first effect selection affordance (e.g., effect selection affordance 122-3) for a first effect (e.g., "Skill 3") causes the corresponding effect to become selected once effect selection criteria are met. In some embodiments, the effect selection criteria are met when a touch-hold requirement or a press requirement is met by contact 120 while contact 120 is detected over the first effect selection affordance 122-3. In some embodiments, the effect selection criteria are met upon detection of the contact 120 on the first effect selection affordance, and the first effect selection affordance remains selected until contact 120 moves to another effect selection affordance in the effect selection panel or moves outside of the effect selection panel. In some embodiments, as shown in FIG. 1G, as soon as the first effect selection affordance 122-3 becomes selected by contact 120, the first selection affordance 122-3 is enlarged to indicate that it has been selected, and a subsequent application input by contact 120 would cause the corresponding effect (e.g., "Skill 3") to be applied to one or more target objects in interaction region 102. In some embodiments, as shown in FIG. 1G, once the first effect selection affordance 122-3 is selected, other effect selection affordances in effect selection panel 118 ceases to be displayed. In some embodiments, the effect selection panel itself ceases to be displayed as well. In some embodiments, the first effect selection affordance 122-3 becomes a floating affordance that is dragged across touch-screen 112 in accordance with the movement of contact 120.

In some embodiments, as shown in FIG. 1G, a position of effect, line of effect, or area of effect (e.g., location, line, or region that is affected by the selected effect (e.g., an attack, a spell, etc.)) is visually indicated in interaction region 102, and one or more target objects for the selected effect are visually indicated in interaction region 102 as well. As shown in FIG. 1G, a line 124 is displayed linking the origin of the effect (e.g., a representation of the player (e.g., an avatar, weapon, or character that is currently controlled by the player using device 100), or the location of contact 120) and the region of effect and/or one or more target objects (e.g., target object 106') of the region of effect (e.g., the nearest hostile character(s)). In some embodiments, the region of effect is visually indicated in the interaction region as well (e.g., region of effect 126 is highlighted to indicate that Skill 3 will be applied to all eligible target objects within region 126). In some embodiments, device 100 automatically identifies the eligible target objects for the selected effect, and based on the location of the objects in the interaction region, the characteristics of the objects (e.g., hostile or friendly, strong or weak, more dangerous or less dangerous, etc.), and/or predefined game strategies (e.g., to preserve life, or to maximize rewards, etc.). In some embodiments, the target objects that are identified for the selected effect is visually indicated as well (e.g., hostile character 106 (now labeled as 106') within the area of effect 126 is highlighted with a changed appearance (e.g., becomes shimmering or transparent)).

FIG. 1G further illustrates that, in some embodiments, once the first effect selection affordance 122-3 is selected, a cancelation affordance 128 is optionally displayed. Movement of contact 120 to cancelation affordance 128 followed by lift-off of contact 120 will cancel the current effect, and optionally restore display of effect selection panel 118. In some embodiments, cancellation affordance 128 is only displayed upon detection of movement of contact 120 after the first effect selection affordance 122-3 has been selected, e.g., as shown in FIGS. 1G-1H.

FIGS. 1G-1M illustrate adjustment of the effect position (e.g., by adjusting the direction, length, and/or size of the position/line/area of effect) of the selected effect in accordance with movement of contact 120.

In FIGS. 1G-1H, movement of the contact 120 while the first effect selection affordance 122-3 is selected causes the device to shift the target selection in accordance with the movement of contact 120. For example, once movement of contact 120 is detected, arrows appear around effect selection affordance 122-3 or contact 120 to indicate that leftward movement will increase the length of the line of effect and reach a target farther away from contact 120, rightward movement will decrease the length of the line of effect and reach a target closer to contact 120, upward movement of contact 120 will cause the line of effect to shift upward to select a target in a higher portion of the interaction region, and downward movement of contact 120 will cause the line of effect to select a target in a lower portion of the interaction region. In some embodiments, movement of contact 120 causes a change in the direction of the line of effect 124 (e.g., in FIGS. 1H-1I and 1J-1K); in some embodiments, movement of contact 120 causes movement of the end position of the line of effect 124 (e.g., as shown in FIGS. 1L-1M); and in some embodiments, movement of contact 120 causes a change in the size of area of effect 126 (e.g., as shown in FIGS. 1I-1J, and 1K-1L). In some embodiments, the changes to the end position of the line/area of effect, the direction of the line of effect, and the size of the area of effect are also determined based on the changes that are occurring in interaction region 102 (e.g., movement of characters, creatures, actions and effects applied by other characters and players, events that are occurring in the game, etc.).

In some embodiments, eligible target objects (e.g., hostile characters that are vulnerable to the currently selected effect) all attract the line of effect and the region that includes the most powerful, or most vulnerable, or the most number of target objects will win and become the actual target objects that are selected for the effect, until additional movement is detected to adjust the currently selected targets. In some embodiments, the line of effect has a predefined trajectory and interaction region 102 is divided into predefined regions based on the power of the selected effect (e.g., affects a single region, a column of two regions, a row of three regions, etc.), and when the end of line of effect is anywhere within one of the predefined regions, it is automatically attracted to the center of the region or one of the eligible targets in the region, and all eligible target objects within the region are selected as target objects for the effect. For example, as shown in FIGS. 1J and 1K, even though the end of line of effect 124 is connected to only one eligible target, both of the eligible targets 116' in the column of two predefined regions (forming a combined area of effect 126) will be affected by the effect when the effect is applied. As shown in FIGS. 1L and 1M, even though the end of line of effect 124 is connected to only one eligible target, all three of the eligible targets 116" in the row of three predefined regions (forming a combined area of effect 126) will be affected by the effect when the effect is applied.

FIGS. 1N-1P illustrate an example process for canceling selection of first effect selection affordance 122-3 without actually applying the effect corresponding to the first effect selection affordance. In some embodiments, as shown in FIG. 1N, when movement of contact 120 is toward cancelation affordance 128, the end of the line of effect is optionally removed from the eligible objects within interaction region 102. In some embodiments, if lift-off of contact 120 is detected when there is no eligible objects identified or selected within the interaction region, the selection of the first selection affordance is canceled and no effect is applied. In some embodiments, button 114 is optionally displayed again after the effect selection is canceled.

FIGS. 1N-1O illustrate that when contact 120 moves to the cancellation affordance 128, cancellation affordance 128 is highlighted (e.g., optionally after a touch-hold requirement or press requirement is met by contact 120 while contact 120 is over the cancelation affordance 120) to indicate that it has now become selected in lieu of the first effect selection affordance 122-3. In some embodiments, once cancellation affordance 128 is selected by contact 120, first effect selection affordance 122-3 ceases to be displayed. FIG. 1P illustrates that, lift-off of contact 120 is detected while cancellation affordance 128 is selected; and upon lift-off of contact 120, no effect is applied to the objects in interaction region 102. In some embodiments, button 114 is redisplayed (e.g., in a manner as shown in FIG. 1A). In some embodiments, button 114 is not redisplayed until another contact is detected and meets the button display criteria for displaying button 114 (e.g., contact is detected in a predefined region and/or meets a predefined gesture pattern and/or time and/or intensity requirement).

Figure 1Q:
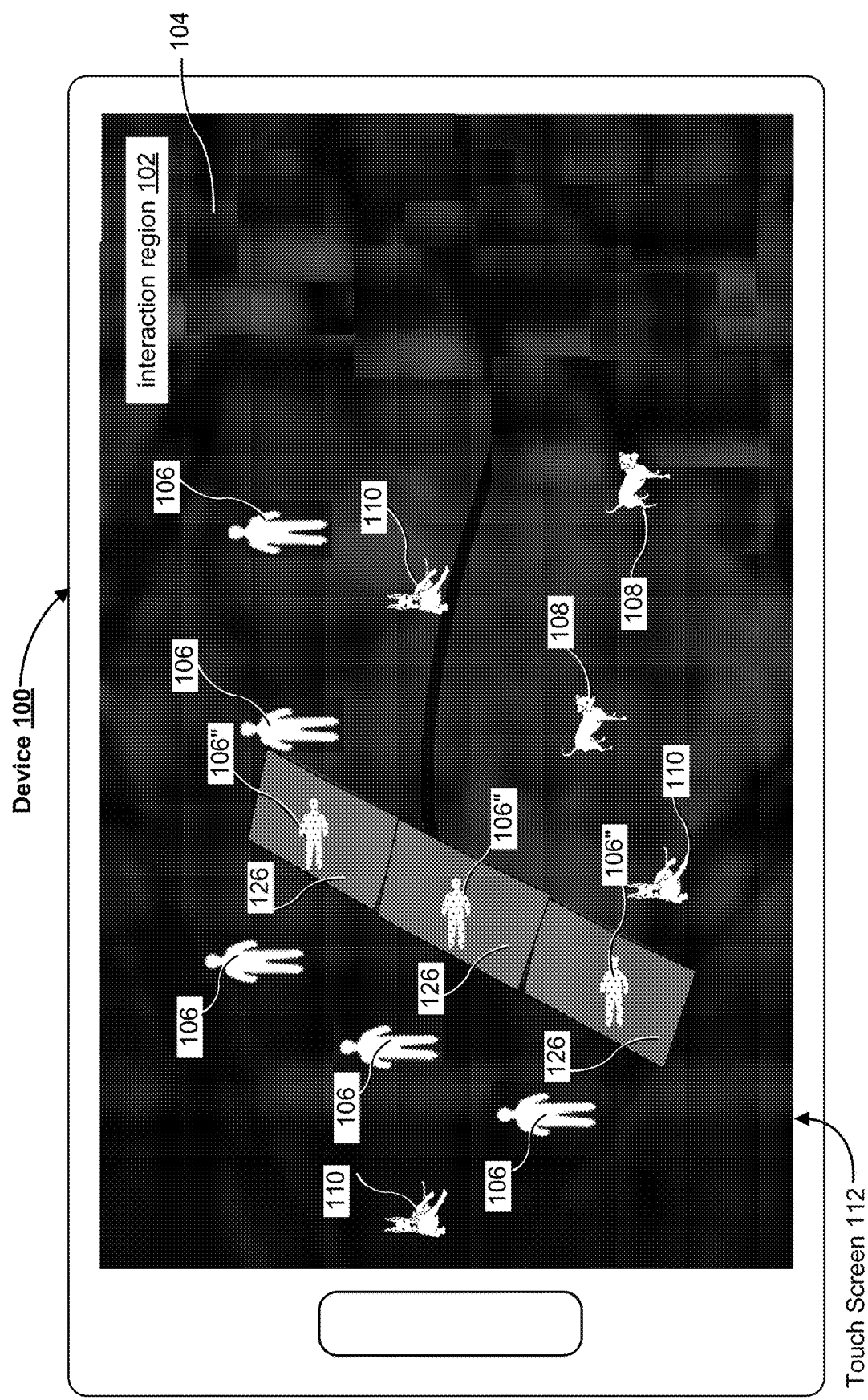

FIG. 1Q illustrates that, if instead of moving to cancellation affordance 128 and lifting off while contact 120 is on cancellation affordance 128, the user lifts off the contact while the first effect selection affordance 122-3 is selected as shown in FIG. 1M, the effect corresponding to the first effect selection affordance 122-3 is applied to the three target objects 106' that are currently within the area of effect 126 of the selected effect (e.g., the hostile characters 106' are attacked by Skill 3, and become petrified or otherwise incur damages in accordance with their characteristics and their predefined responses to Skill 3 (e.g., hostile characters 106 that are affected by the effect are now labeled as 106" in FIG. 1Q)). In some embodiments, different types of target objects respond to the application of the effect differently, and may have different changes in their respective characteristics, statuses, behaviors, and states.

Figure 2:
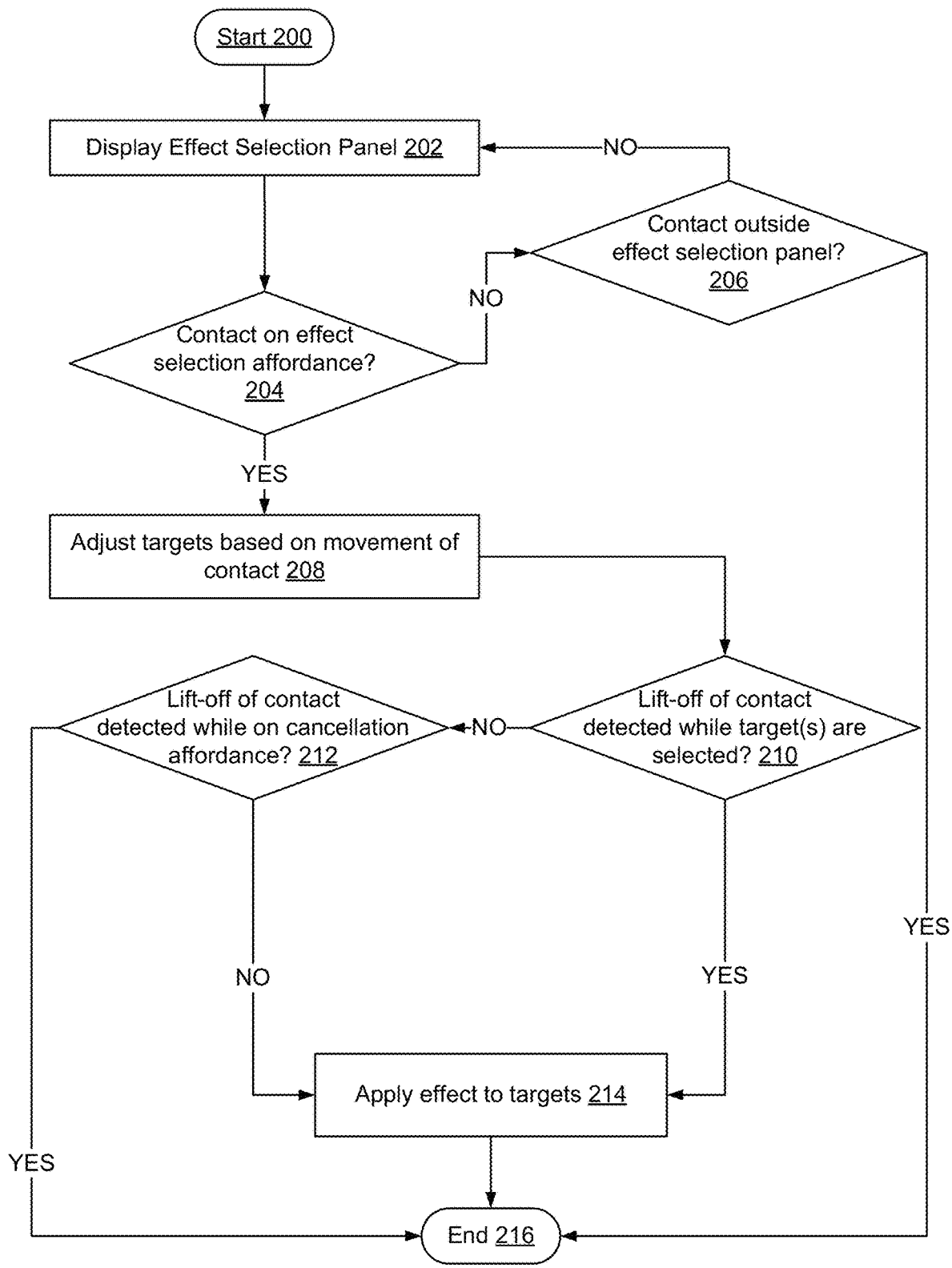
FIG. 2 is a flow diagram illustrating a method of providing game controls in accordance with some embodiments.
Figure 3A:
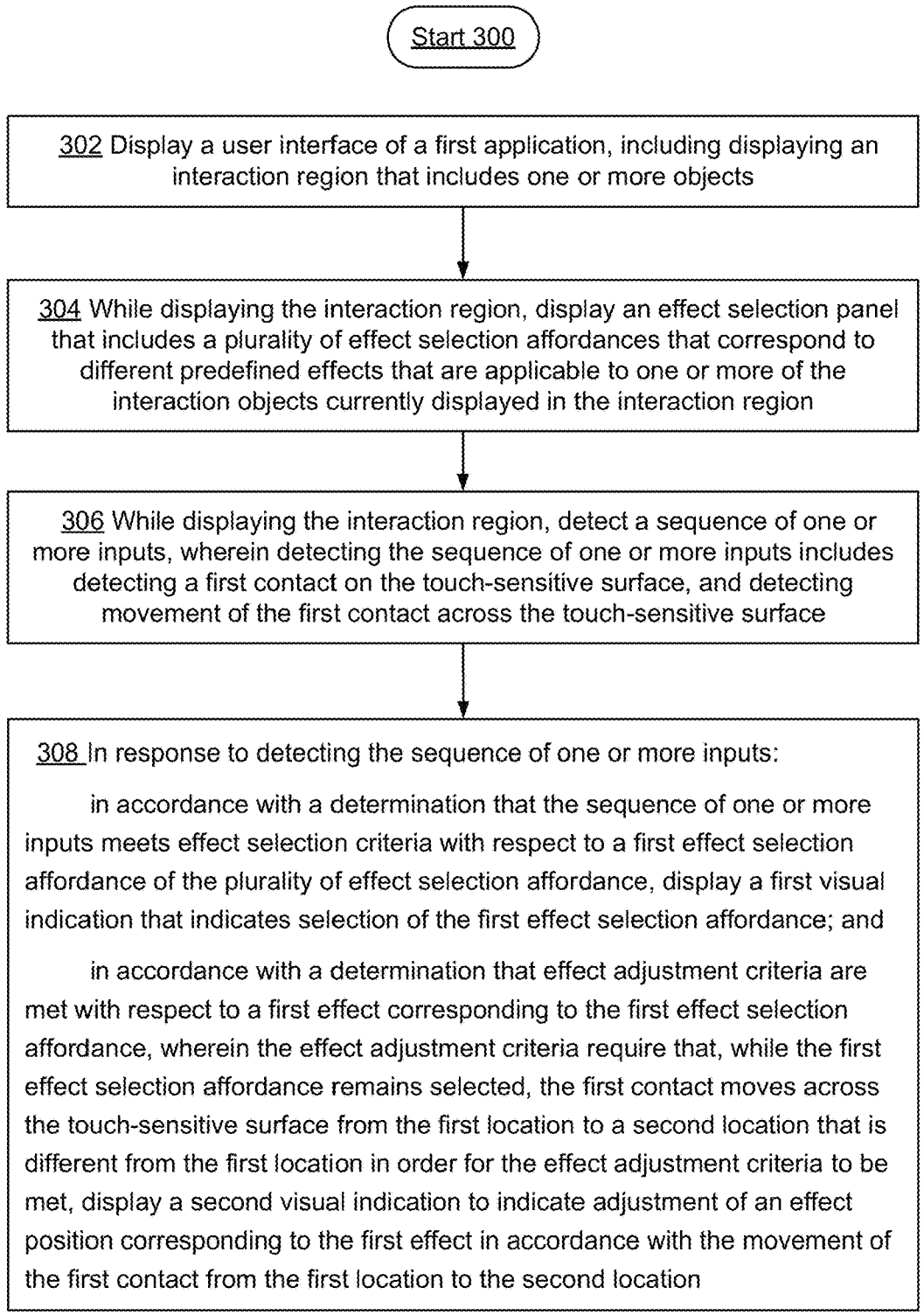

FIG. 2 is a flow diagram illustrating a method 200 of providing game controls in accordance with some embodiments. The method 200 is performed at an electronic device (e.g., device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 200 are, optionally, combined and/or the order of some operations is, optionally, changed.

In method 200, device 100 displays (202) the effect selection panel (e.g., effect selection panel 118 in FIG. 1C), e.g., in response to a predefined input by a contact or gesture (e.g., as shown in FIGS. 1A-1C or accompanying descriptions). After the effect selection panel is displayed, device 100 determines (204) whether the same contact is now detected over an effect selection affordance (e.g., one of the effect selection affordances 122) in the effect selection panel. In some embodiments, if display of the effect selection panel is maintained without requiring a continuously maintained contact, the device simply determines whether a contact is detected over an effect selection affordance, and does not require the contact to be the same contact that triggered the display of the effect selection panel in the first place. If the device determines that the contact is not currently detected within the effect selection panel, then the device determines (206) whether the contact is currently detected outside of the effect selection panel. If the device determines that the contact is currently detected outside of the effect selection panel, the device ends (216) the process, and optionally ceases to display the effect selection panel. If the device determines that the contact is currently detected within the effect selection panel, the device continues to monitor the movement of the contact (e.g., go back to step 202) and determines (204) whether the contact is currently detected on an effect selection affordance within the effect selection panel. If the device determines that the contact is currently detected on an effect selection affordance within the effect selection panel (e.g., as shown in FIG. 1G), the device selects the effect selection affordance (e.g., in accordance with time or intensity requirement), and adjusts (208) the position/line/area of effect and identifies target objects in the interaction region in accordance with movement of the contact (e.g., as shown in FIGS. 1G-1M). The device then determines (210) whether lift-off of the contact is detected while one or more target objects are selected. If the device determines that lift-off of the contact is detected while one or more target objects are selected, the device applies (214) the selected effect to the selected target objects (e.g., as shown in FIGS. 1M and 1Q), and the process ends (216). If the device determines that lift-off of the contact is detected before one or more target objects are selected or when no target objects are selected, the device determines (212) whether the contact has moved to the cancelation affordance when lift-off of the contact is detected. In some embodiments, if the device determines that the contact has not moved to the cancelation affordance when lift-off of the contact is detected, the device still applies (214) the selected effect to the last selected target objects. If the device determines that the contact has moved to the cancellation affordance when lift-off of the contact is detected, the device forgoing application of the selected effect and ends (216) the process (e.g., as shown in FIGS. 1N-1P). More details of the process 200 are provided with respect to FIGS. 1A-1Q and accompanying descriptions, and method 300 below.

FIGS. 3A-3D are flow diagrams illustrating a method 300 of providing game controls (e.g., displaying, browsing, selecting and applying effects to game objects), in accordance with some embodiments. The method 300 is performed at an electronic device (e.g., device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 300 are, optionally, combined and/or the order of some operations is, optionally, changed.

In some embodiments, method 300 is performed at a device having a display and a touch-sensitive surface (e.g., a touch-screen display that serves both as the display and the touch-sensitive surface). The device displays (302) a user interface (e.g., user interface 104) of a first application (e.g., a gaming application for a role playing game, a board game, a one person shooter game, a strategy game, etc.), including displaying an interaction region (e.g., a game board or a scene in a game) that includes one or more objects (e.g., game characters, creatures, enemies, treasures, inanimate objects, items, puzzles, game pieces, etc.). In some embodiments, the one or more objects (e.g., hostile characters 106, friendly characters 108, and neutral characters 110 in FIG. 1A) have predefined characteristics and behaviors, and move and/or change their appearances and/or actions in accordance with what is happening within the interaction region and predefined game rules and logic. In some embodiments, some objects may disappear or move out of the interaction region (e.g., the visible portion of the user interface or game scene) and additional objects may appear in the interaction region, for example, as a result of what is happening within the interaction region and/or predefined game rules and logic. In some embodiments, the background of the interaction region is an animated game scene, and the game scene evolves in accordance with predefined storyline, game rules and logic, and/or the interactions that are occurring in the interaction region.

While displaying the interaction region (e.g., interaction region 102), the device displays (304) an effect selection panel (e.g., effect selection panel 118 in FIG. 1C) that includes a plurality of effect selection affordances (e.g., effect selection affordances 122 in FIG. 1C) that correspond to different predefined effects (e.g., a type of attack, a type of skill, a type of effect, a type of status, a type of ability, etc.) that are applicable to one or more of the interaction objects currently displayed in the interaction region (e.g., to cause a change in the actions, states, status, abilities, behaviors, characteristics, and/or appearances of the interactive objects that are eligible targets of the selected effect(s) and are within the line of effect (LOE) (or position of effect, or area of effect) of the selected effects). In some embodiments, the effect selection panel is displayed in response to an input (e.g., a selection of a predefined affordance (e.g., panel display affordance 114 in FIG. 1B) that is concurrently displayed with the interaction region, or detection of a contact in a predefined region of the display, detection of a predefined gesture by a contact, etc.). In some embodiment, the effect selection panel is displayed as part of the user interface without requiring any user input.

While displaying the interaction region, the device detects (306) a sequence of one or more inputs, wherein detecting the sequence of one or more inputs includes detecting a first contact (e.g., contact 120) on the touch-sensitive surface, and detecting movement of the first contact across the touch-sensitive surface.

In response to detecting the sequence of one or more inputs (308): in accordance with a determination that the sequence of one or more inputs meets effect selection criteria with respect to a first effect selection affordance (e.g., effect selection affordance 122-3 in FIG. 1F) of the plurality of effect selection affordance, the device displays a first visual indication that indicates selection of the first effect selection affordance (e.g., displaying the first visual indication includes highlighting the first effect selection affordance, and/or ceasing to display other effect selection affordances while maintaining display of the first effect selection affordance or a variant thereof, e.g., as shown in FIGS. 1F-1G) (e.g., when the first effect selection affordance is selected, a first effect corresponding to the first selection affordance becomes ready for application on one or more target objects upon subsequent detection of an activation input); and in accordance with a determination that effect adjustment criteria are met with respect to a first effect (e.g., "Skill 3") corresponding to the first effect selection affordance (e.g., effect selection affordance 122-3), wherein the effect adjustment criteria require that, while the first effect selection affordance remains selected (e.g., after the first effect selection affordance is selected in response to an earlier selection input by the first contact), the first contact moves across the touch-sensitive surface from the first location to a second location that is different from the first location (e.g., movement away from the first selection affordance after the first selection affordance has been selected by the first contact) in order for the effect adjustment criteria to be met, the device displays a second visual indication to indicate adjustment of an effect position corresponding to the first effect in accordance with the movement of the first contact from the first location to the second location (e.g., as indicated by movement of a visible line of effect or movement of a zone or area of effect (e.g., a spotlight defining the region within which an eligible target object will be affected by the first effect when the activation input is detected)). This is illustrated in FIGS. 1G-1M, for example. In some embodiments, in accordance with a determination that the effect adjustment criteria are not met with respect to the first effect (e.g., when the first effect selection affordance was not selected by the first contact before the first contact moved from the first location to the second location, or when the first contact did not move after the selecting the first effect selection affordance), the device forgoes displaying the second visual effect to indicate the adjustment of the effect position corresponding to the first effect in accordance with the movement of the first contact from the first location to the second location. For example, if movement of the first contact is detected while the first effect selection affordance is not selected, the device may move the focus selector (e.g., the first contact or a visual indication of the first contact on the display) from the first effect selection affordance to another effect selection affordance in accordance with the movement of the first contact. In some embodiments, the selection affordance under the focus selector is highlighted in a manner (e.g., highlighted in a different manner from the highlighting of the effect selection affordance in a selected state) to indicate a pre-selection state of the selection affordance. A pre-selected effect selection affordance becomes selected when the effect selection criteria are met with respect to the pre-selected effect selection affordance.

In some embodiments, prior to displaying the effect selection panel, the device displays (310), in the user interface of the first application, a panel-display affordance (e.g., displaying a game effect icon (e.g., button 114 in FIG. 1A) overlaid on the interaction region), wherein the panel-display affordance corresponds to the effect selection panel, wherein: detecting the sequence of one or more inputs includes detecting the first contact at a location on the touch-sensitive surface that corresponds to the panel-display affordance (e.g., detecting initial touch-down of the first contact (e.g., contact 120) over the panel-display affordance (e.g., button 114 in FIG. 1B)), and detecting first movement of the first contact from the location that corresponds to the panel-display affordance to the first location that corresponds to the first effect selection affordance (e.g., the first contact is continuously maintained on the touch-sensitive surface when triggering the display of the effect selection panel, selecting the first effect selection affordance after the effect selection panel is displayed, and adjusting the first effect after selection of the first effect selection affordance); This is illustrated in FIGS. 1B-1C and 1F, where contact 120 is continuously maintained throughout the duration of the inputs. The effect selection panel is displayed in response to detecting the first contact at the location on the touch-sensitive surface that corresponds to the panel-display affordance (e.g., before the lift-off or movement of the first contact is detected, and while the first contact is continuously maintained on the touch-screen). This is illustrated in FIGS. 1B-1C, for example. In some embodiments, the effect selection panel is displayed in response to the first contact being maintained at its initial touch-down location with less than a threshold amount of movement for at least a threshold amount of time (e.g., a touch-hold requirement is met by contact 120 while the contact 120 is detected on the button 114 in FIG. 1C). In some embodiments, the effect selection panel is displayed after the first contact moves from its initial touch-down location to the panel-display affordance (e.g., button 114) and is maintained over the panel-display affordance with less than a threshold amount of movement for more than a threshold amount of time. In some embodiments, the requirement for holding the first contact over the panel-display affordance for at least a threshold amount of time is replaced with a requirement for pressing on the panel-display affordance with an intensity exceeding a predefined press intensity threshold (e.g., an intensity threshold greater than the contact detection intensity threshold). In some embodiments, if the initial touch-down location of the first contact is not at a location that corresponds to the panel-display affordance, the device forgoes displaying the effect selection panel. In some embodiments, if the panel-display criteria are not met (e.g., the first contact is not maintained over the panel-display affordance with less than the predefined amount of time, or the intensity of the first contact did not exceed the required press intensity threshold while the first contact is detected over the panel-display affordance), the device forgoes displaying the effect selection panel.

In some embodiments, in response to detecting the sequence of one or more inputs: in accordance with the determination that the sequence of one or more inputs meets the effect selection criteria with respect to the first effect selection affordance of the plurality of selection affordances, the device displays (312) a third visual indication that indicates at least one target object of the first effect that corresponds to the first effect selection affordance, wherein the at least one target object (e.g., target objects 106' in FIG. 1G) is selected from one or more objects currently visible in the interaction region in accordance with predefined target selection criteria corresponding to the first effect. In some embodiments, the predefined target selection criteria corresponding to the first effect specifies a maximum number of concurrently selected targets for the first effect (e.g., a single target at a time, or a maximum of five targets at a time, or a single row of targets at a time, etc.). In some embodiments, the predefined target selection criteria require that only certain types of objects (e.g., only certain types of characters, creatures, enemies, allies, items, and/or game objects, etc.) are eligible targets for the first effect. In some embodiments, the predefined target selection criteria require that only eligible targets within a threshold range of a reference location (e.g., the location of the first contact, or the location of the character, weapon, or item that is currently controlled by the user) can be selected as targets of the first effect. In some embodiments, the predefined target selection criteria select one or more targets in accordance with a set of default rules when the first effect selection affordance becomes selected by the first contact. For example, upon selection of the first effect selection affordance, one or more objects that are eligible targets for the first effect (e.g., of the object type(s) that can be affected by the first effect) and that are closest to a predefined reference location (e.g., the location of the first contact or the location of the character/weapon/game object that is currently controlled by the user) become selected as the initial targets for the first effect by default (e.g., before any movement of the first contact is detected to adjust the effect position of the first effect). This is illustrated in FIG. 1G, for example.

In some embodiments, displaying the second visual indication to indicate adjustment of the effect position corresponding to the first effect in accordance with the movement of the first contact from the first location to the second location includes (314) one or more of: (1) moving a line of effect (e.g., line 124 in FIGS. 1G-1M) corresponding to the first effect in accordance with the movement of the first contact (e.g., contact 120) from the first location to the second location; (2) changing a size and/or location of a zone of effect (e.g., area of effect 126) corresponding to the first effect in accordance with the movement of the first contact from the first location to the second location; and (3) changing an identity and/or count of the currently selected targets for the first effect in accordance with the movement of the first contact from the first location to the second location. In some embodiments, moving the first contact changes the direction of the line of effect (e.g., the direction of the line of effect rotates around the predefined reference location in accordance with movement of the first contact in the clockwise or counter-clockwise direction). This is illustrated in FIGS. 1H-1I, for example. In some embodiments, moving the first contact changes the position of the zone of effect of the first effect (e.g., the zone of effect moves in a direction in accordance with the movement direction and movement distance of the first contact). In some embodiments, moving the first contact expands or contracts the zone of effect of the first effect (e.g., the zone of effect expands or contracts in accordance with the movement direction and movement distance of the first contact). This is illustrated in FIGS. 1I-1J, 1J-1K, 1K-1L, and 1L-1M, for example. In some embodiments, as a result of moving the line of effect or changing the location and/or size of the zone of effect of the first effect in accordance with the movement of the first contact, different objects and/or different number of objects in the interaction region become selected as targets for the first effect. In some embodiments, the line of effect (e.g., line 124) or zone of effect (e.g., area 126) of the first effect is visually indicated in the interaction region. In some embodiments, the line of effect or zone of effect are visibly indicated in the interaction region, and the currently selected target objects are visually identified in the interaction region. This is illustrated in FIGS. 1G-1M, for example.

In some embodiments, the effect selection criteria include (316) a criterion that is met when the first contact is detected at the first location on the touch-sensitive surface that corresponds to the first effect selection affordance (e.g., when detecting the first contact at the first location includes detecting the first contact at the first location upon touch-down of the first contact when the effect selection panel is already displayed in the user interface, or detecting touch-down of the first contact at an initial location (e.g., at a location that corresponds to an affordance (e.g., button 114) for triggering display of the effect selection panel) that is different from the first location, and detecting movement of the first contact from its initial touch-down location to the first location (e.g., the location that corresponds to the first effect selection affordance (e.g., effect selection affordance 122-3) in the effect selection panel)). In some embodiments, the effect selection criteria are met with respect to the first effect selection affordance when the first contact is detected over the first effect selection affordance in the effect selection panel with less than a threshold amount of movement for at least a threshold amount time, or when an increase in intensity of the first contact exceeds a predefined press intensity threshold while the first contact is detected over the first effect selection affordance in the effect selection panel). In some embodiments, in accordance with a determination that the sequence of one or more inputs does not meet the effect selection criteria with respect to the first effect selection affordance, the device forgoes displaying the first visual indication that indicates the selection of the first effect selection affordance. For example, the effect selection criteria are not met (1) when the first contact is not detected over the first effect selection affordance with less than the threshold amount of movement for at least the threshold amount of time (e.g., when the movement path of the first contact never overlapped with the first effect selection affordance, or when the first contact merely went past the first effect selection affordance but did not remain over the first effect selection affordance for the threshold amount of time) and the effect selection criteria require a touch-hold input to be detected over a respective effect selection affordance, or (2) when the first contact merely remained over the first effect selection affordance but did not meet the required press intensity threshold and the effect selection criteria require a press input to be detected over a respective effect selection affordance.

In some embodiments, detecting the sequence of one or more inputs includes (318) detecting initial movement of the first contact while the effect selection panel is displayed, and the effect selection criteria include a criterion that is met when an initial movement of the first contact (e.g., movement of the first contact that was detected before the first effect selection affordance becomes selected) causes the first effect selection affordance to be moved from an initial display location of the first effect selection affordance across the display to a predefined affordance selection region of the effect selection panel.

In some embodiments, detecting the sequence of one or more inputs include detecting initial movement of the first contact while the effect selection panel is displayed, and the method includes (320): in response to detecting the initial movement of the first contact: in accordance with a determination that the initial movement of the first contact meets first movement criteria (e.g., the first movement criteria require that the initial movement of the first contact is in a first movement direction (e.g., with increasing absolute x value in the positive x direction accompanied by increasing absolute y value in the positive y direction or increasing absolute y value in the negative y direction relative to the touch-down location of the first contact)), scrolling the plurality of effect selection affordances in the effect selection panel in a first scroll direction (e.g., rotating a circular arrangement of the plurality of effect selection affordances in the effect selection panel in a clockwise direction (or counter-clockwise direction), or moving a vertical or horizontal list of the plurality of effect selection affordances in the effect selection panel in upward (or downward) or leftward (or rightward)); and in accordance with a determination that the initial movement of the first contact meets second movement criteria that are distinct from the first movement criteria (e.g., the second movement criteria require that the initial movement of the first contact is in a second movement direction (e.g., with increasing absolute x value in the negative x direction accompanied by increasing absolute y value in the positive y direction or increasing absolute y value in the negative y direction relative to the touch-down location of the first contact)), scrolling the plurality of effect selection affordances in the effect selection panel in a second scroll direction that is opposite the first scroll direction (e.g., rotating the circular arrangement of the plurality of effect selection affordances in the effect selection panel in a counter-clockwise direction (or clockwise direction), or moving a vertical or horizontal list of the plurality of effect selection affordances in the effect selection panel in downward (or upward) or rightward (or leftward)). This is illustrated in FIGS. 1C-1E, for example.

In some embodiments, detecting the sequence of one or more inputs includes detecting lift-off of the first contact, and the method includes (322): in response to detecting the lift-off of the first contact: in accordance with a determination that effect application criteria are met with respect to the first effect by the sequence of one or more inputs, wherein the effect application criteria require that the lift-off of the first contact is detected while the first effect selection affordance is selected and while at least one target is currently identified in the interaction region for the first effect in order for the effect application criteria to be met with respect to the first effect, applying the first effect to the at least one target that is currently identified in the interaction region (e.g., releasing an attack, or skill, or status that corresponds to the first effect selection affordance to the interactive object(s) that are selected as the target(s) for the first effect at the time that the lift-off of the first contact is detected) (this is illustrated in FIGS. 1M and 1Q, for example); and in accordance with a determination that effect cancelation criteria are met with respect to the first effect by the sequence of one or more inputs, wherein the effect cancelation criteria require that the lift-off of the first contact is detected while the effect application affordance is no longer selected or while no target is currently identified in the interaction region (e.g., for the first effect or any other effect) in order for the effect cancelation criteria to be met, forgoing application of the first effect that corresponds to the first effect selection affordance. In some embodiments, after lift-off of the first contact is detected, the device ceases to display the first effect selection affordance and, optionally, the effect selection panel (if the effect selection panel was displayed in response to detection of the first contact) (this is illustrated in FIGS. 1O-1P, for example).

It should be understood that the particular order in which the operations in FIGS. 3A-3D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 200) are also applicable in an analogous manner to method 300 described above with respect to FIGS. 3A-3D. For example, the contacts, gestures, user interface objects, intensity thresholds, focus selectors, and/or animations described above with reference to method 300 optionally have one or more of the characteristics of the contacts, gestures, user interface objects, intensity thresholds, focus selectors, and/or animations described herein with reference to other methods described herein (e.g., method 200). For brevity, these details are not repeated here.

The operations in the information processing methods described above are, optionally, implemented by running one or more functional modules in information processing apparatus such as general purpose processors (e.g., as described above with respect to FIGS. 1A and 4) or application specific chips. The operations described above with reference to FIGS. 3A-3D are, optionally, implemented by components depicted in FIGS. 1A and 4.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method of performing object interactions at an electronic device having a display and a touch-sensitive surface, the method comprising:
    displaying a user interface of a first application, the user interface including an interaction region that includes one or more interaction objects and an effect selection panel that includes a plurality of effect selection affordances that correspond to predefined effects that are applicable to one or more of the interaction objects currently displayed in the interaction region;

selecting a first effect selection affordance of the plurality of effect selection affordance in accordance with a first user input in the effect selection panel via a contact on the touch-sensitive surface;

while the contact on the touch-sensitive surface continues, displaying a cancelation affordance adjacent the first effect selection affordance and a first visual indication in the interaction region that indicates a region of effect by the first effect selection affordance, wherein a current position of the first visual indication is dependent on a current location of the contact on the touch-sensitive surface;

in response to detecting a location at which the contact on the touch-sensitive surface terminates:

deselecting the first effect selection affordance when the contact on the touch-sensitive surface terminates at the cancelation affordance, further including removing the first visual indication from the display; and applying the first effect to at least one of the interaction objects in the interaction region based on a last position of the first visual indication when the contact on the touch-sensitive surface terminates not at the cancelation affordance.

2. The method of claim 1, further comprising:

while the first effect selection affordance remains selected, detecting a movement of the contact across the touch-sensitive surface from a first location in the effect selection panel to a second location that is different from the first location; and displaying a second visual indication to indicate adjustment of an effect position corresponding to the first effect in accordance with the movement of the first contact from the first location to the second location.

3. The method of claim 2, wherein displaying the second visual indication to indicate adjustment of the effect position corresponding to the first effect in accordance with the movement of the first contact from the first location to the second location includes one or more of:

(1) moving a line of effect corresponding to the first effect in accordance with the movement of the contact from the first location to the second location;

(2) changing a size and/or location of a zone of effect corresponding to the first effect in accordance with the movement of the contact from the first location to the second location; and (3) changing an identity and/or count of the currently selected targets for the first effect in accordance with the movement of the contact from the first location to the second location.

4. The method of claim 1, further comprising:

prior to displaying the effect selection panel, displaying, in the user interface of the first application, a panel-display affordance, wherein the panel-display affordance corresponds to the effect selection panel, wherein:

the effect selection panel is displayed in response to detecting a contact at a location on the touch-sensitive surface that corresponds to the panel-display affordance.

5. The method of claim 1, wherein the displaying a first visual indication in the interaction region that indicates a region of effect by the first effect selection affordance further comprises:

displaying a third visual indication that indicates at least one interaction object in the interaction region linked to the first effect selection affordance, wherein the at least one interaction object is selected from one or more objects currently visible in the interaction region in accordance with predefined target selection criteria associated with the first effect selection affordance.

6. The method of claim 1, wherein a movement of the contact on the touch-sensitive surface causes a movement of the first effect selection affordance from an initial display location of the first effect selection affordance across the touch-sensitive surface to a predefined affordance selection region of the effect selection panel.

7. The method of claim 6, further comprising:

in accordance with a determination that the movement of the contact on the touch-sensitive surface meets first movement criteria, scrolling the plurality of effect selection affordances in the effect selection panel in a first scroll direction; and in accordance with a determination that the movement of the contact on the touch-sensitive surface meets second movement criteria that are distinct from the first movement criteria, scrolling the plurality of effect selection affordances in the effect selection panel in a second scroll direction that is opposite the first scroll direction.

8. The method of claim 1, further comprising:

in accordance with a determination that effect cancelation criteria are met with respect to the first effect, wherein the effect cancelation criteria require that the contact on the touch-sensitive surface terminates while the first effect application affordance is no longer selected or no target is currently identified in the interaction region, forgoing application of the first effect that corresponds to the first effect selection affordance.

9. An electronic device, comprising:

a display;

a touch-sensitive surface;

one or more processors;

memory; and one or more programs, wherein the one or more programs are stored in the memory and configured to be executed by the one or more processors and perform a plurality of operations including:

displaying a user interface of a first application, the user interface including an interaction region that includes one or more interaction objects and an effect selection panel that includes a plurality of effect selection affordances that correspond to predefined effects that are applicable to one or more of the interaction objects currently displayed in the interaction region;

selecting a first effect selection affordance of the plurality of effect selection affordance in accordance with a first user input in the effect selection panel via a contact on the touch-sensitive surface;

while the contact on the touch-sensitive surface continues, displaying a cancelation affordance adjacent the first effect selection affordance and a first visual indication in the interaction region that indicates a region of effect by the first effect selection affordance, wherein a current position of the first visual indication is dependent on a current location of the contact on the touch-sensitive surface;

in response to detecting a location at which the contact on the touch-sensitive surface terminates:

deselecting the first effect selection affordance when the contact on the touch-sensitive surface terminates at the cancelation affordance, further including removing the first visual indication from the display; and applying the first effect to at least one of the interaction objects in the interaction region based on a last position of the first visual indication when the contact on the touch-sensitive surface terminates not at the cancelation affordance.

10. The electronic device of claim 9, wherein the plurality of operations further comprise:
while the first effect selection affordance remains selected, detecting a movement of the contact across the touch-sensitive surface from a first location in the effect selection panel to a second location that is different from the first location; and
displaying a second visual indication to indicate adjustment of an effect position corresponding to the first effect in accordance with the movement of the first contact from the first location to the second location.

11. The electronic device of claim 10, wherein displaying the second visual indication to indicate adjustment of the effect position corresponding to the first effect in accordance with the movement of the first contact from the first location to the second location includes one or more of:
(1) moving a line of effect corresponding to the first effect in accordance with the movement of the contact from the first location to the second location;
(2) changing a size and/or location of a zone of effect corresponding to the first effect in accordance with the movement of the contact from the first location to the second location; and
(3) changing an identity and/or count of the currently selected targets for the first effect in accordance with the movement of the contact from the first location to the second location.

12. The electronic device of claim 9, wherein the plurality of operations further comprise:
prior to displaying the effect selection panel, displaying, in the user interface of the first application, a panel-display affordance, wherein the panel-display affordance corresponds to the effect selection panel, wherein:
the effect selection panel is displayed in response to detecting a contact at a location on the touch-sensitive surface that corresponds to the panel-display affordance.

13. The electronic device of claim 9, wherein the displaying a first visual indication in the interaction region that indicates a region of effect by the first effect selection affordance further comprises:
displaying a third visual indication that indicates at least one interaction object in the interaction region linked to the first effect selection affordance, wherein the at least one interaction object is selected from one or more objects currently visible in the interaction region in accordance with predefined target selection criteria associated with the first effect selection affordance.

14. The electronic device of claim 9, wherein a movement of the contact on the touch-sensitive surface causes a movement of the first effect selection affordance from an initial display location of the first effect selection affordance across the touch-sensitive surface to a predefined affordance selection region of the effect selection panel.

15. The electronic device of claim 14, wherein the plurality of operations further comprise:
in accordance with a determination that the movement of the contact on the touch-sensitive surface meets first movement criteria, scrolling the plurality of effect selection affordances in the effect selection panel in a first scroll direction; and in accordance with a determination that the movement of the contact on the touch-sensitive surface meets second movement criteria that are distinct from the first movement criteria, scrolling the plurality of effect selection affordances in the effect selection panel in a second scroll direction that is opposite the first scroll direction.

16. The electronic device of claim 9, wherein the plurality of operations further comprise:
in accordance with a determination that effect cancelation criteria are met with respect to the first effect, wherein the effect cancelation criteria require that the contact on the touch-sensitive surface terminates while the first effect application affordance is no longer selected or no target is currently identified in the interaction region, forgoing application of the first effect that corresponds to the first effect selection affordance.

17. A non-transitory computer readable storage medium storing one or more programs, the one or more programs comprising instructions, which when executed by an electronic device with a display and a touch-sensitive surface, cause the electronic device to perform a plurality of operations including:
displaying a user interface of a first application, the user interface including an interaction region that includes one or more interaction objects and an effect selection panel that includes a plurality of effect selection affordances that correspond to predefined effects that are applicable to one or more of the interaction objects currently displayed in the interaction region;
selecting a first effect selection affordance of the plurality of effect selection affordance in accordance with a first user input in the effect selection panel via a contact on the touch-sensitive surface;
while the contact on the touch-sensitive surface continues, displaying a cancelation affordance adjacent the first effect selection affordance and a first visual indication in the interaction region that indicates a region of effect by the first effect selection affordance, wherein a current position of the first visual indication is dependent on a current location of the contact on the touch-sensitive surface;
in response to detecting a location at which the contact on the touch-sensitive surface terminates:
deselecting the first effect selection affordance when the contact on the touch-sensitive surface terminates at the cancelation affordance, further including removing the first visual indication from the display; and
applying the first effect to at least one of the interaction objects in the interaction region based on a last position of the first visual indication when the contact on the touch-sensitive surface terminates not at the cancelation affordance.

18. The non-transitory computer readable storage medium of claim 17, wherein the plurality of operations further include:
while the first effect selection affordance remains selected, detecting a movement of the contact across the touch-sensitive surface from a first location in the effect selection panel to a second location that is different from the first location; and
displaying a second visual indication to indicate adjustment of an effect position corresponding to the first effect in accordance with the movement of the first contact from the first location to the second location.

19. The non-transitory computer readable storage medium of claim 17, wherein the plurality of operations further include:

prior to displaying the effect selection panel, displaying, in the user interface of the first application, a panel-display affordance, wherein the panel-display affordance corresponds to the effect selection panel, wherein:

the effect selection panel is displayed in response to detecting a contact at a location on the touch-sensitive surface that corresponds to the panel-display affordance.

20. The non-transitory computer readable storage medium of claim 17, wherein the displaying a first visual indication in the interaction region that indicates a region of effect by the first effect selection affordance further comprises:

displaying a third visual indication that indicates at least one interaction object in the interaction region linked to the first effect selection affordance, wherein the at least one interaction object is selected from one or more objects currently visible in the interaction region in accordance with predefined target selection criteria associated with the first effect selection affordance.

* * * * *